(12) United States Patent
Floyd et al.

(10) Patent No.: US 10,397,735 B2
(45) Date of Patent: Aug. 27, 2019

(54) THRESHOLD BARRIER SYSTEM

(71) Applicant: Radio Systems Corporation, Knoxville, TN (US)

(72) Inventors: Steven Roger Floyd, Knoxville, TN (US); Duane A. Gerig, Knoxville, TN (US); William P. Moore, Knoxville, TN (US); Thomas Brandon Lee, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 0 days.

(21) Appl. No.: 15/906,339

(22) Filed: Feb. 27, 2018

(65) Prior Publication Data

US 2018/0295468 A1    Oct. 11, 2018

Related U.S. Application Data

(60) Provisional application No. 62/463,983, filed on Feb. 27, 2017.

(51) Int. Cl.
*G07C 9/00* (2006.01)
*H04W 4/02* (2018.01)
*A01K 15/02* (2006.01)
*A01K 15/04* (2006.01)
*A01K 27/00* (2006.01)
*H04B 17/27* (2015.01)
*H04W 4/021* (2018.01)

(52) U.S. Cl.
CPC ............ *H04W 4/021* (2013.01); *A01K 15/023* (2013.01); *A01K 15/04* (2013.01); *G07C 9/00111* (2013.01); *H04B 17/27* (2015.01); *H04W 4/026* (2013.01); *A01K 27/009* (2013.01)

(58) Field of Classification Search
CPC .. A01K 15/021; A01K 29/005; A01K 11/008; A01K 27/009; A01K 15/023; A01K 11/006; A01K 15/02; A01K 29/00; A01K 11/007; A01K 27/001
USPC ...................................................... 340/573.3
See application file for complete search history.

(56) References Cited

U.S. PATENT DOCUMENTS

| | | | | |
|---|---|---|---|---|
| 5,794,569 A * | 8/1998 | Titus | ..................... | A01K 15/023 119/721 |
| 6,415,742 B1 * | 7/2002 | Lee | ....................... | A01K 15/023 119/719 |
| 6,600,422 B2 * | 7/2003 | Barry | ................... | A01K 15/023 119/719 |
| 6,657,544 B2 * | 12/2003 | Barry | ................... | A01K 15/023 119/721 |
| 7,918,190 B2 * | 4/2011 | Belcher | ................ | A01K 15/023 119/721 |

(Continued)

*Primary Examiner* — Mark S Blouin
(74) *Attorney, Agent, or Firm* — Baker Donelson

(57) ABSTRACT

A system is described that includes a transmitter for generating a magnetic field comprising a first detection region and a second detection region, wherein the first detection region is different than the second detection region. The system comprises a receiver configured to detect at a location of the receiver in the magnetic field a magnetic field vector, a polarity, and at least one additional vector. The system comprises the receiver configured to use the magnetic field vector, the polarity, and the at least one additional vector to determine a position of the receiver in the magnetic field.

20 Claims, 13 Drawing Sheets

(56) References Cited

U.S. PATENT DOCUMENTS

| | | | |
|---|---|---|---|
| 8,047,161 B2* | 11/2011 | Moore | A01K 15/023 |
| | | | 119/721 |
| 9,861,076 B2* | 1/2018 | Rochelle | A01K 15/023 |
| 2016/0021850 A1* | 1/2016 | Stapelfeld | A01K 11/008 |
| | | | 342/357.52 |

* cited by examiner

THRESHOLD BARRIER SYSTEM

CROSS REFERENCE TO RELATED APPLICATIONS

This application claims the benefit of U.S. Patent Application No. 62/463,983, filed Feb. 27, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BRIEF DESCRIPTION OF THE DRAWINGS

So that the manner in which the present application can be better understood, certain illustrations and figures are appended hereto. It is to be noted, however, that the drawings illustrate only selected embodiments and elements of a threshold barrier system and are therefore not to be considered limiting in scope for the threshold barrier system as described herein may admit to other equally effective embodiments and applications.

DETAILED DESCRIPTION

Systems and methods of an outdoor containment system and an indoor threshold barrier system are described herein. The outdoor containment system relies upon the placement of a boundary wire around a perimeter and the use of a receiver to detect polarity of a magnetic field generated by current driven through the wire. Alternatively, an indoor counterpart to the outdoor system, i.e. a threshold barrier system, implements a unique "threshold" concept that uses a low profile antenna coil to generate a uniform magnetic field at a barrier threshold such that a receiver coil detects a single change in polarity as such receiver coils cross through the magnetic field. The indoor threshold barrier system eliminates the need to place a perimeter boundary wire within a home.

The following disclosure first describes an embodiment of the outdoor containment system. Thereafter, the disclosure describes an "indoor" embodiment of the outdoor containment system referred to as a threshold barrier system which eliminates the use of a perimeter boundary wire. Further, the indoor threshold system incorporates a PIR (passive infrared) motion detector into system transmitters to regulate transmitter rate of transmission and conserve battery life.

Outdoor Containment System

An embodiment of an outdoor containment system as further described in U.S. Pat. No. 8,047,161 provides an animal containment system for containing an animal within a boundary, for maximizing the animal's usable area within the boundary, and for not discouraging the animal from returning to within the boundary in the event the animal moves beyond the boundary.

Figure 1:
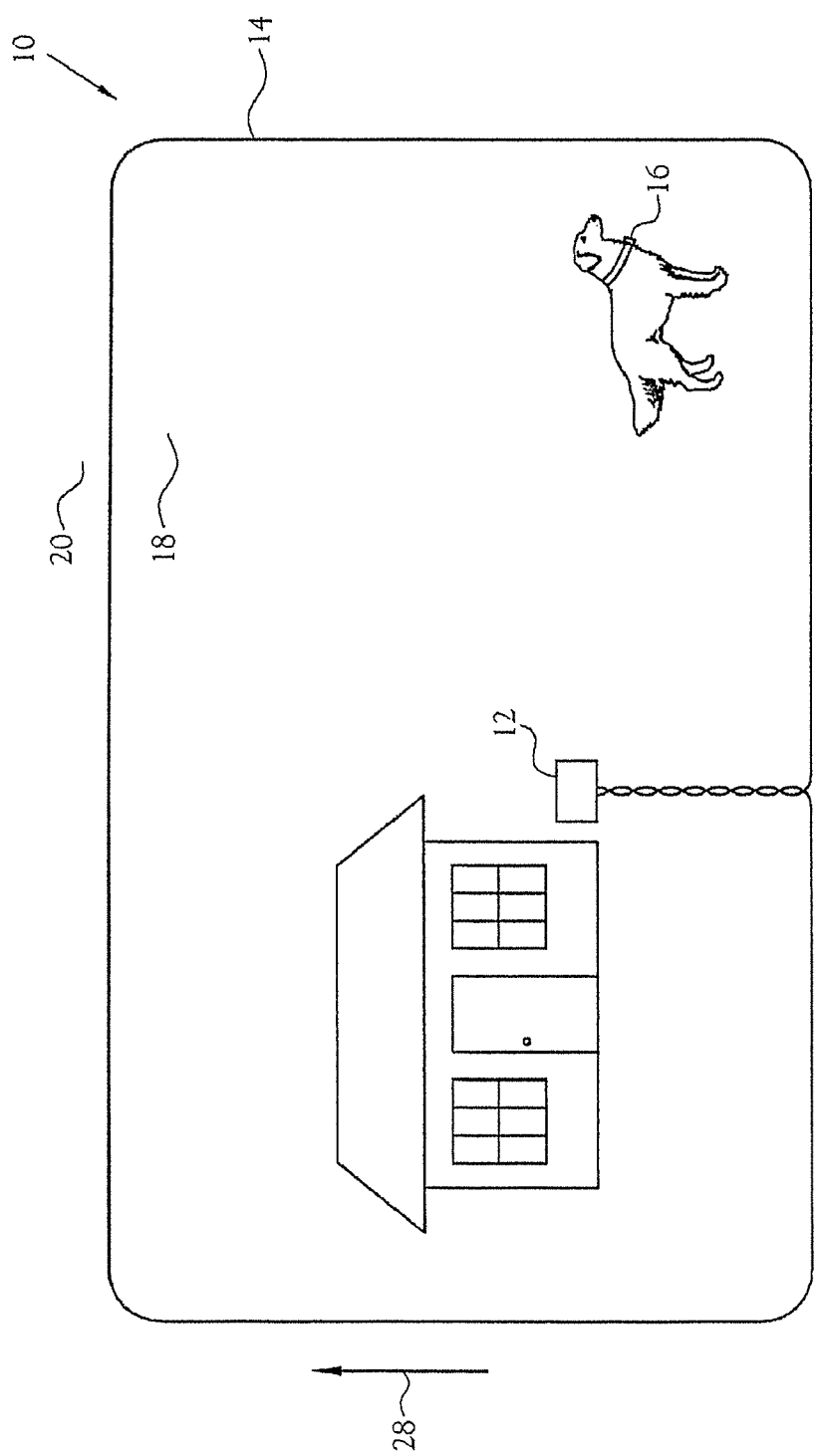
FIG. 1 is an example of animal containment system under an embodiment.

The animal containment system 10 of FIG. 1 includes a signal generator 12, a wire 14, and a rover unit 16. The signal generator 12 is in electrical communication with the wire 14 and in wireless communication with the rover unit 16. The wire 14 defines a boundary, which defines an area within the boundary 18 and an area beyond the boundary 20. In the illustrated embodiment, the wire 14 defines the perimeter of a residential yard such that the perimeter of the yard is the boundary, the yard is the area within the boundary 18, and the area outside the yard is the area beyond the boundary 20. Those skilled in the art will recognize that the wire 14 can define a boundary other than the perimeter of a residential yard without departing from the scope and spirit of the present invention. In one embodiment, the wire 14 is buried in the ground such that the wire 14 is not visible from the surface of the ground. The rover unit 16 is carried by the animal. In the illustrated embodiment, the rover unit 16 is mounted to an animal collar and the collar is secured to the animal such that the animal carries the rover unit 16. Those skilled in the art will recognize that the rover unit 16 can be carried by the animal by ways other than an animal collar without departing from the scope or spirit of the present invention.

Figure 2:
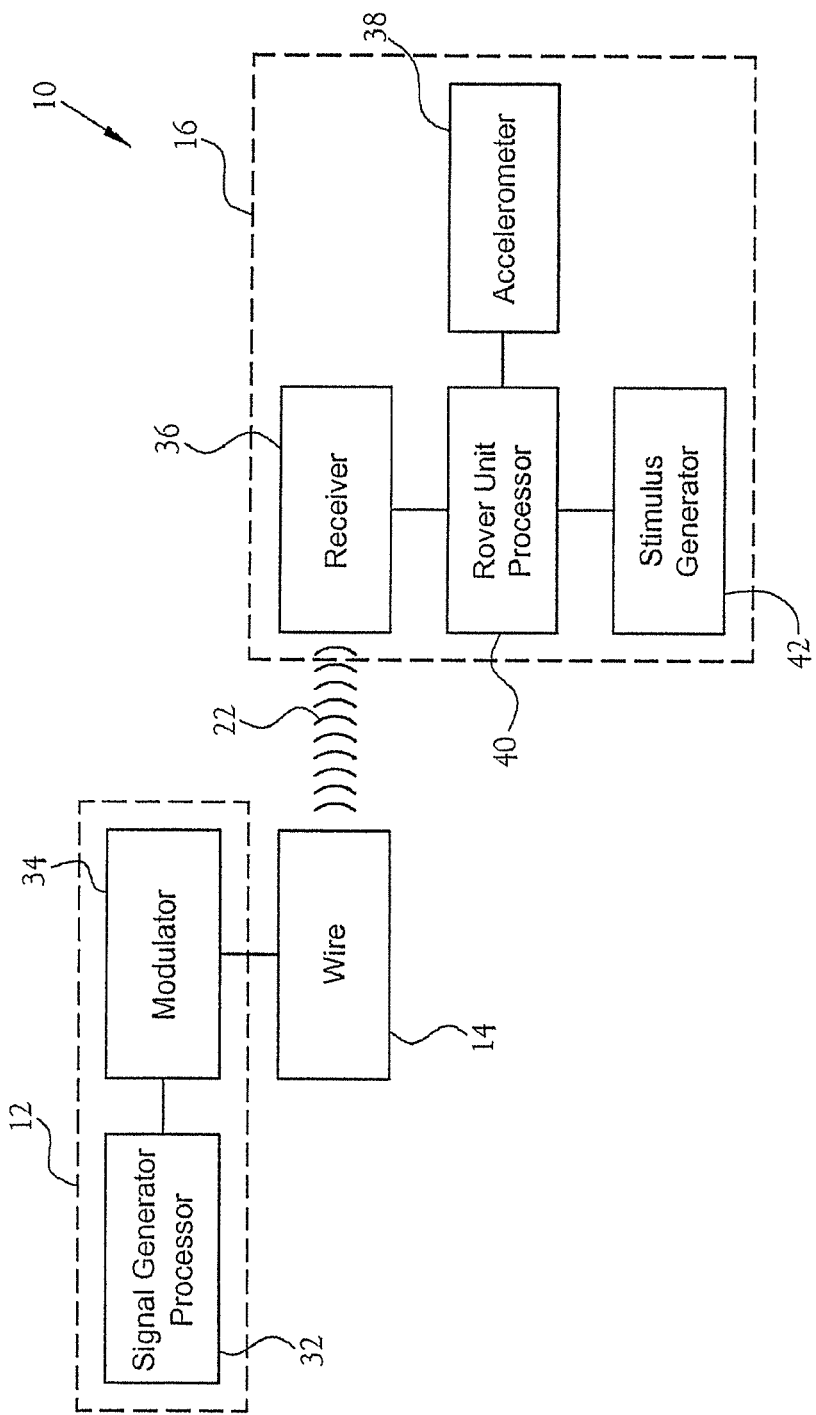
FIG. 2 is a block diagram of animal containment system under an embodiment.
Figure 3:
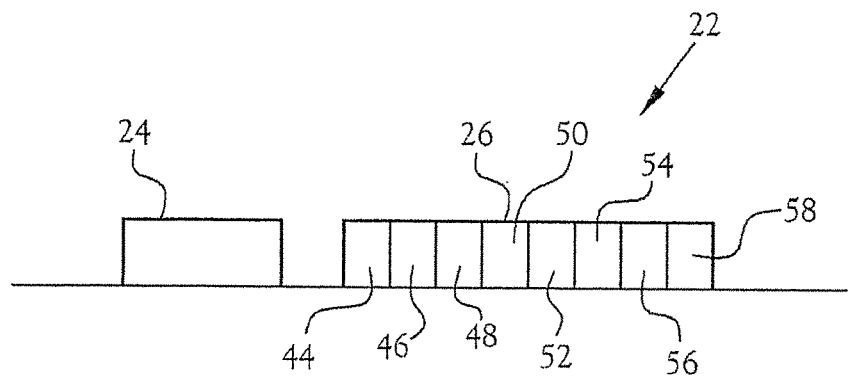
FIG. 3 is a representation of an activation signal transmitted and received by components of an animal containment system under an embodiment.

FIG. 2 is a block diagram of one embodiment of the animal containment system 10 in accordance with the various features of the present embodiment. In the illustrated embodiment, the signal generator 12 includes a signal generator processor 32 and a modulator 34, whereby the signal generator processor 32 is in electrical communication with the modulator 34. The signal generator processor 32 generates a digital activation signal 22. The activation signal 22 includes operating instructions for the rover unit 16. FIG. 3 illustrates one embodiment of the activation signal 22 in accordance with the various features of the embodiment. In the illustrated embodiment, the activation signal 22 includes a header 24 and a plurality of data bits 26. More specifically, the activation signal 22 of the illustrated embodiment includes eight data bits 26, namely a first data bit 44, a second data bit 46, a third data bit 48, a fourth data bit 50, a fifth data bit 52, a sixth data bit 54, a seventh data bit 56, and an eighth data bit 58. The header 24 is used to establish communication with the rover unit 16 by identifying the activation signal 22 as such. The data bits 26 include operating instructions for the rover unit 16. Operating instructions may include identifying information of the outdoor system transmitter. Such instructions also include operational parameters of the receiver. The instructions may also establish a level of stimulus to be applied to an animal wearing a receiver. Further the activation signal may encode instructions that are associated with specific receivers and that vary stimulation levels and operational parameters for each such receiver.

It should be noted that the activation signal 22 can be a digital signal other than the specifically illustrated activation signal 22 of FIG. 3 without departing from the scope or spirit of the present invention. For example, the activation signal 22 does not require the header 24 to remain within the scope or spirit of the present invention. Additionally, the activation signal 22 can include any number of data bits 26 and remain within the scope and spirit of the present invention.

Figure 4:
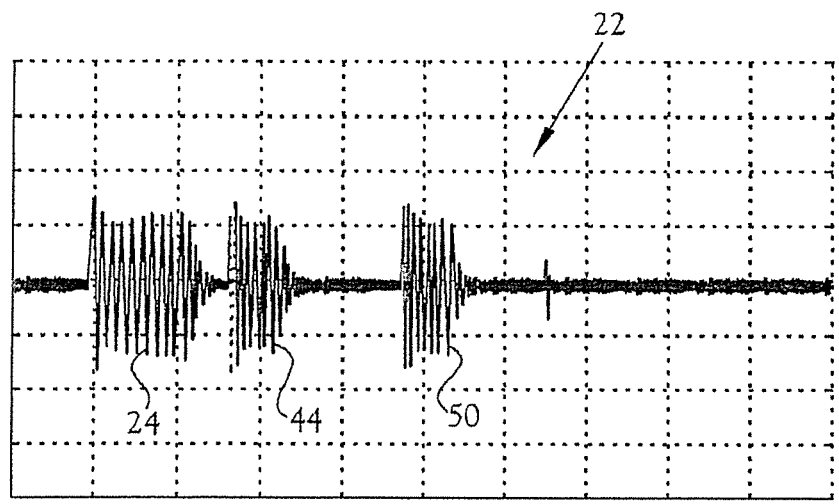
FIG. 4 is a representation of a modulated activation signal under an embodiment.
Figure 5:
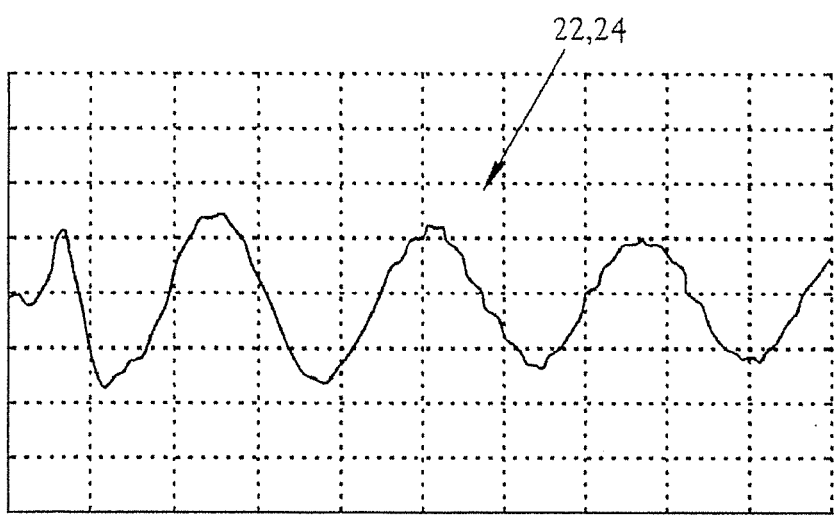
FIG. 5 is a first carrier cycle of the modulated activation signal of FIG. 4 under an embodiment.

Considering again FIG. 2, the modulator 34 receives the activation signal 22 from the signal generator processor 32 and modulates the activation signal 22. More specifically, the modulator 34 employs amplitude modulation such that each bit of the activation signal 22 is represented by a plurality of carrier cycles. FIG. 4 illustrates the activation signal 22 of FIG. 3 modulated by the modulator 34, whereby the heading 24, the first data bit 44, and the fourth data bit 50 of activation signal 22 are digital "1's" and the remaining data bits 26 are digital "0's". In the illustrated embodiment of FIG. 4, the modulated header 24 is represented by 17 carrier cycles and each of the modulated data bits 26 are represented by 8 carrier cycles. The signal generator processor 32 dictates the direction of the first carrier cycle for each plurality of carrier cycles. In the illustrated embodiment, the signal generator processor 32 dictates the direction of the first carrier cycle for the modulated header 24 and each of the modulated data bits 26. More specifically, FIG. 5 illustrates the first few cycles of the modulated header 24 of FIG. 4. In the illustrated embodiment, the signal generator processor 32 causes the first carrier cycle of the modulated header 24 to have a positive direction. Because the direction of the first carrier cycle of the modulated header 24 is positive, the direction of the first carrier cycle of each of the modulated data bits 26 is positive.

Figure 6:
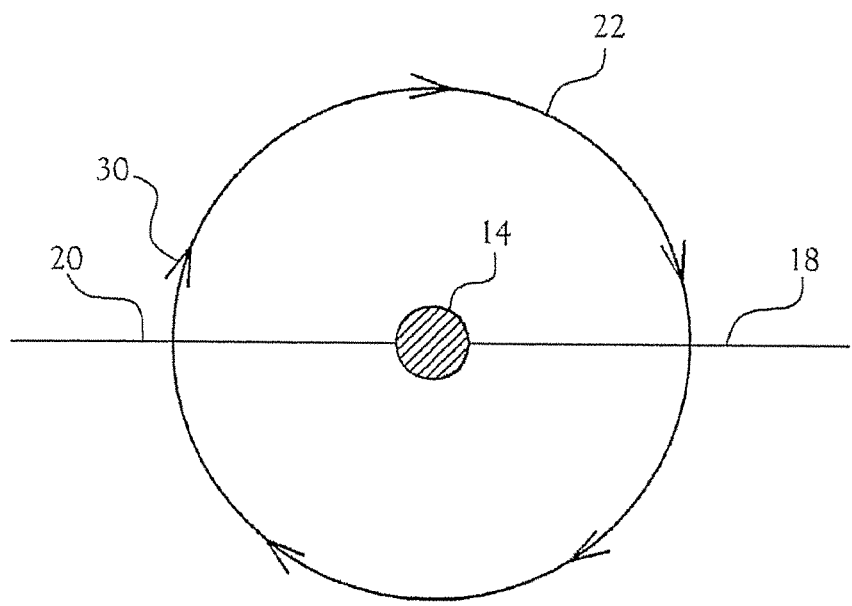
FIG. 6 illustrates a magnetic field generated by the activation signal travelling through a perimeter wire of an embodiment.

Considering again FIG. 2, after modulating the activation signal 22, the signal generator 12 wirelessly transmits the activation signal 22 by way of the wire 14. More specifically, the signal generator 12 drives current through the wire 14 such that the activation signal 22 radiates from the wire 14 in the form of a magnetic field. In the illustrated embodiment of FIG. 1, the signal generator 12 drives current through the wire 14 in the direction indicated by the arrow at 28. FIG. 6 illustrates a cross-sectional view of the wire 14 whereby the direction indicated by the arrow 28 is into the page. Because the direction of the current driven through the wire 14 is into the page, the resulting magnetic field, that is, the activation signal 22, rotates about the wire 14 in the direction indicated by the arrow at 30. Consequently, the polarity of the activation signal 22 within the boundary 18 is substantially opposite the polarity of the activation signal 22 beyond the boundary 20. It should be noted that an alternating circuit power source may drive the periodic carrier cycles onto the line. However, the receiver detects the polarity of the first carrier wave (with positive direction) of each modulated bit. Therefore, FIG. 6 shows a single direction uniform field with a polarity within the boundary substantially opposite the polarity outside the boundary.

Figure 7:
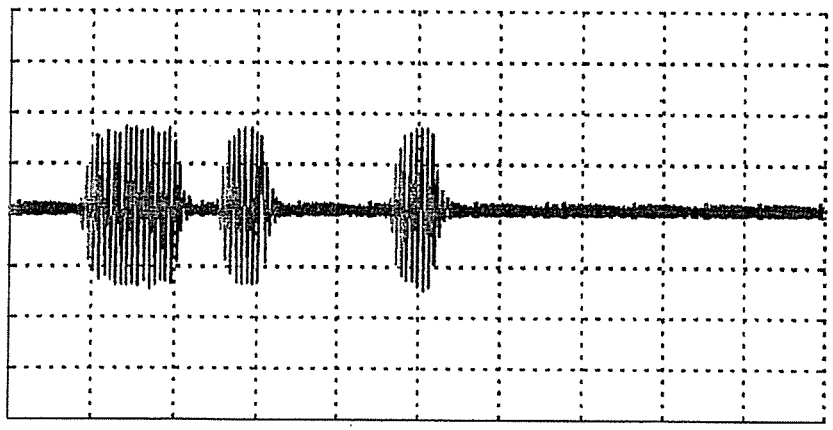
FIG. 7 illustrates the modulated activation signal of FIG. 4 without having an emphasized first carrier cycle under an embodiment.
Figure 8:
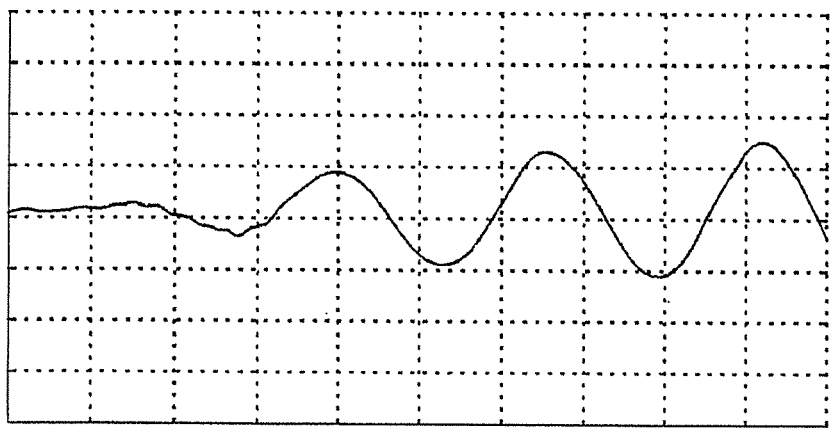
FIG. 8 illustrates an alternate perspective of a first carrier cycle of the modulated activation signal of FIG. 7.

When the signal generator 12 transmits the activation signal 22, the signal generator 12 emphasizes the first carrier cycle of each plurality of carrier cycles. More specifically, the signal generator 12 sharply increases the current driven through the wire 14 when transmitting each first carrier cycle such that the amplitude of the signal 22 at each first carrier cycle sharply increases. Because the amplitude of the first carrier cycle of each plurality of carrier cycles is sharply increased, the first carrier cycle is easily detectable by the rover unit 16 in accordance with subsequent discussion. FIG. 4 illustrates the activation signal 22 having each first carrier cycle emphasized in accordance with the above-discussion. Conversely, FIG. 7 illustrates the activation signal 22 of FIG. 4, whereby each first carrier cycle is not emphasized. As an additional illustration of the above-discussed principle, FIG. 5 illustrates the first few carrier cycles of the modulated header 24 of the activation signal 22 of FIG. 4, and FIG. 8 illustrates the first few carrier cycles of the modulated header 24 of the activation signal 22 of FIG. 7.

Considering again FIG. 2, the rover unit 16 of the illustrated embodiment includes a receiver 36, an accelerometer 38, a rover unit processor 40, and a stimulus generator 42. The receiver 36 and the accelerometer 38 are in electrical communication with the rover unit processor 40, which is in electrical communication with the stimulus generator 42. The receiver 36 is adapted to receive the wirelessly transmitted activation signal 22. In one embodiment, the receiver 36 includes three mutually orthogonal antennas such that the receiver 36 robustly receives the activation signal 22 regardless of the orientation of the rover unit 16. In one embodiment, the receiver 36 includes an inductor and capacitor tank circuit. The accelerometer 38 indicates the direction of gravity with respect to the orientation of the accelerometer 38. In one embodiment, the accelerometer 38 is a three-axis accelerometer. The receiver 36 and the accelerometer 38 are positioned within the housing of the rover unit 16 such that the orientation of the receiver 36 with respect to the accelerometer 38 is established and stored at the rover unit processor 40. The rover unit processor 40 receives the direction of gravity from the accelerometer 38, considers the orientation of the receiver 36 with respect to the orientation of accelerometer 38, and determines the orientation of the receiver 36 with respect to the direction of gravity and, consequently, determines the orientation of the receiver 36 with respect to the ground.

The rover unit processor 40 receives the activation signal 22 from the receiver 36. Because the signal generator 12 emphasizes each first carrier cycle of the modulated activation signal 22, the rover unit processor 40 detects the direction of each first carrier cycle of the activation signal 22. Because the polarity of the activation signal 22 within the boundary 18 is substantially opposite the polarity of the activation signal 22 beyond the boundary 20, the direction of each first carrier cycle of the activation signal 22 received within the boundary 18 is substantially opposite the direction of each first carrier cycle of the activation signal 22 received beyond the boundary 20. Additionally, the rover unit processor 40 stores information indicative of the direction of each first carrier cycle of the activation signal 22 within the boundary 18 and the direction of each first carrier cycle of the activation signal 22 beyond the boundary 20. Accordingly, the rover unit processor 40 considers the orientation of the receiver 36 with respect to the ground and determines the orientation of the antenna of the receiver 36 that is most perpendicular to the ground. The rover unit processor 40 analyzes the modulation of the activation signal 22 as received by the antenna most perpendicular to the ground. Stated differently, the rover unit processor 40 considers the direction of at least one first carrier cycle of the modulated activation signal 22 with respect to the stored information indicative of the direction of each first carrier cycle of the activation signal 22 within the boundary 18 and the direction of each first carrier cycle of the activation signal 22 beyond the boundary 20. The rover unit processor 40 determines the polarity of the received activation signal 22 without utilizing an independent polarity indicator, such as a polarity bit or polarity pulse. Additionally, in analyzing the modulation of the activation signal 22, the rover unit processor 40 determines whether the rover unit 16 is within the boundary 18 or beyond the boundary 20. Because the rover unit 16 is carried by the animal, when the rover unit processor 40 determines that the rover unit 16 is within the boundary 18, the rover unit processor 40 determines that the animal is within the boundary. Similarly, when the rover unit processor 40 determines that the rover unit 16 is beyond the boundary, the rover unit processor 40 determines that the animal is beyond the boundary 20.

The rover unit processor 40 does not activate the stimulus generator 42 when the receiver 36 of the rover unit 16 does not receive the activation signal 22. The receiver 36 does not receive the activation signal 22 when the rover unit 16 is a distance from the wire 14 such that the strength of the activation signal 22 is not sufficient to be detected by the receiver 36. The circumstances at which the receiver 36 does not receive the activation signal 22 include the rover unit 16 being within the boundary 18 and a sufficient distance from the wire 14 and the rover unit 16 being beyond the boundary 20 and a sufficient distance from the wire 14. Additionally, the rover unit processor 40 does not activate the stimulus generator 42 when the receiver 36 receives the activation signal 22 and determines that the rover unit 40 is within the boundary 18, regardless of the distance between the rover unit 16 and the wire 14. Conversely, when the rover unit processor 40 determines that the rover unit 16 is within the boundary 18 and subsequently determines that the rover unit 16 is beyond the boundary 20, the rover unit processor 40 activates the stimulus generator 42. When the stimulus generator 42 is activated, it delivers a stimulus to the animal until the rover unit processor 40 deactivates the stimulus generator 42. The rover unit processor 40 deactivates the stimulus generator 42 when the rover unit processor 40 determines that the rover unit 16 is within the boundary 18 or when a predetermined period of time, which begins when the stimulus generator 42 is activated, expires. When the rover unit processor 40 determines that the rover unit 16 is beyond the boundary 20 and the rover unit processor 40 has deactivated the stimulus generator 42 in accordance with the above-discussion, the rover unit processor 40 does not activate the stimulus generator 42.

Considering the above-discussion, the animal can be anywhere within the boundary 18 without the rover unit 16 delivering a stimulus to the animal. Consequently, the animal containment system 10 maximizes the animal's usable area within the boundary 18. Additionally, when the animal traverses the wire 14, that is, moves from within the boundary 18 to beyond the boundary 20, the rover unit 16 delivers a stimulus to the animal until the animal returns from beyond the boundary 20 to within the boundary 18, encouraging the animal to remain within the boundary 18. Consequently, the animal containment system 10 contains the animal within the boundary 18. Additionally, in the event the animal moves beyond the boundary 20 and does not return to within the boundary 18 within the predetermined period of time, the rover unit 16 ceases to deliver a stimulus to the animal. This safety feature prevents the rover unit 16 from delivering an excessive stimulus to the animal when the animal does not return to within the boundary 18 because, for example, the animal becomes confused when the rover unit 16 delivers a stimulus to the animal such that the animal does not return to within the boundary 18.

The systems and methods of an outdoor containment system described above include disclosure of a method for detecting polarity relative to a barrier wire and for using such information to determine position of a receiver. It should be noted that the outdoor containment system described above is not limited to this method of polarity detection and may include alternative methods. An outdoor containment system may include a method of polarity detection as described in U.S. Pat. No. 7,918,190 as just one example. U.S. Pat. No. 7,918,190 is herein incorporated by reference in its entirety. It should also be noted that any such polarity detection methods described or incorporated herein may be used with respect to the threshold barrier system as further described below.

The disclosure set forth above describes elements of an outdoor containment system. U.S. application Ser. No. 13/844,411 describes an electronic pet gate. Such application is herein incorporated by reference in its entirety.

Threshold Barrier System

As described above, systems and methods of the outdoor containment system disclose containment of an animal by using a boundary wire typically buried around the perimeter of an individual's property. A modulated signal is transmitted on the boundary wire that includes an amplitude emphasis on select data bits generating a magnetic field with which the receiver interacts to detect the signal polarity on the boundary wire. The receiver detects the magnetic field of the transmitted signal using multiple inductor antennas. The receiver is able to determine which side of the boundary wire the receiver is located by the polarity of the voltage induced within the inductor antenna. If the receiver detects that the animal is outside the boundary area, a stimulus is applied to the animal until it returns to the inside of the boundary area.

Figure 9:
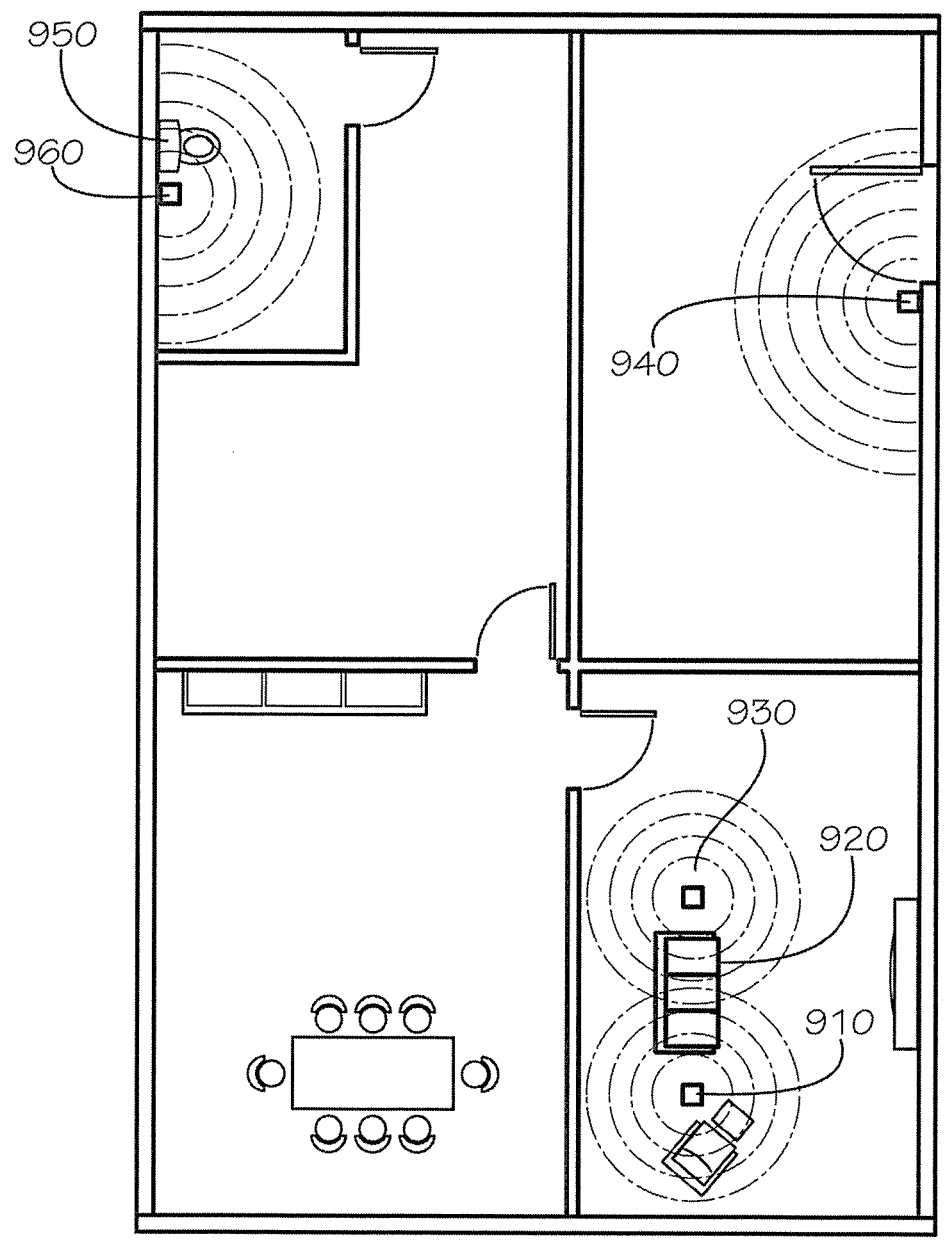
FIG. 9 is an example of a standard indoor avoidance system under an embodiment.

An "indoor" embodiment of the outdoor containment system implements such system indoors without the use of a perimeter boundary wire. This indoor embodiment referred to as a threshold barrier system is different from other indoor avoidance barrier systems which transmit a circular electromagnetic signal that is used to repel and keep animals away from the transmitter. Such systems are described in detail in U.S. Pat. Nos. 7,046,152, 7,068,174, 7,117,822, 7,204,204, 7,278,376, 7,495,570, and 8,342,135. Each of the aforementioned patents mentioned is herein incorporated by reference in its entirety to the same extent as if each individual patent was specifically and individually indicated to be incorporated by reference. These disclosed systems and methods are typically used inside the home to keep pets off of furniture and/or prevent them from entering or leaving a room. As seen in FIG. 9, transmitters are strategically placed throughout a room to create a circular magnetic field around protected/shielded areas such as doors, furniture and bathroom facilities. Note that receivers that are used with the outdoor animal containment system (as described above) and with these standard avoidance systems are also compatible with the indoor threshold barrier system described below so that one receiver can be used for multiple animal control applications. In the discussion below, the receiver of the indoor threshold barrier system may be the same receiver as the receiver disclosed with respect to the outdoor containment system. Accordingly, the receiver of the indoor threshold barrier system may be part of a larger collar assembly which itself may include one or more of a processing unit, accelerometer and stimulus generator. For purposes of the discussion below, general reference is made to a receiver which interacts with a transmitter component to detect polarity of a signal. Based on the context of the term receiver in the discussion below, reference to a receiver may also generally refer to a larger collar assembly.

When using these avoidance barriers in the homes to contain animals within certain rooms or prevent them from entering rooms, problems may arise. As just one example, because the transmitted field is circular, the placement of the transmitter and the magnetic field size required to encompass a passageway can interfere with the animal's ability to move within the house. For instance, if a barrier was placed in a doorway opening to a hallway, with the intent to keep an animal out of a room, the circular transmitted pattern would need to be large enough to block the door but would also extend into the hallway, possibly limiting movement of the animal in the hallway. Similarly, if the barrier was placed in a doorway, intending to keep the animal in the room, the circular pattern would need to be large enough to block the doorway but would also extend into the room, possibly limiting the movement of the animal in the room. (See FIG. 9, 940.) In both of these examples, the diameter of the magnetic field from the transmitter needs to be large enough to prevent the animal from simply running through the field, receiving minimal or no stimulus.

As yet another problem, a receiver reverses polarity twice (as further described below) as it passes through a circular magnetic field of a standard avoidance field. An interior threshold barrier system is proposed which provides a receiver capable of detecting magnet field polarity and that activates only when the receiver crosses over the threshold and the signal polarity of the magnet field reverses in the inductor antennas. For an animal being contained within a room, this system would allow the animal to utilize the full extent of the room without receiving a stimulus until crossing over the threshold. Conversely, for the animal being kept out of a room, this would allow the animal the full extent of the hallway area without receiving a stimulus until crossing over the threshold into the room. Also, since the receiver registers positive indication of the threshold crossing event, the stimulus applied to the dog would continue until the animal crossed back over the threshold. With the threshold barrier system, the animal could not escape as with the above mentioned avoidance barriers, i.e. the animal could not simply run through the signal field.

The functionality of the threshold barrier system described above requires a transmitter designed to generate a magnetic field that only travels in a single direction within the area that the receiver can be located. The magnetic field from a transmitting coil for use in this application is bidirectional due to the AC current flowing in the coil. For simplicity in understanding of the design concepts described herein, the magnetic field characteristics are described as traveling in a single direction. Two methods are described herein for generating a magnetic field that is capable of operating in a threshold barrier system.

Figure 10:
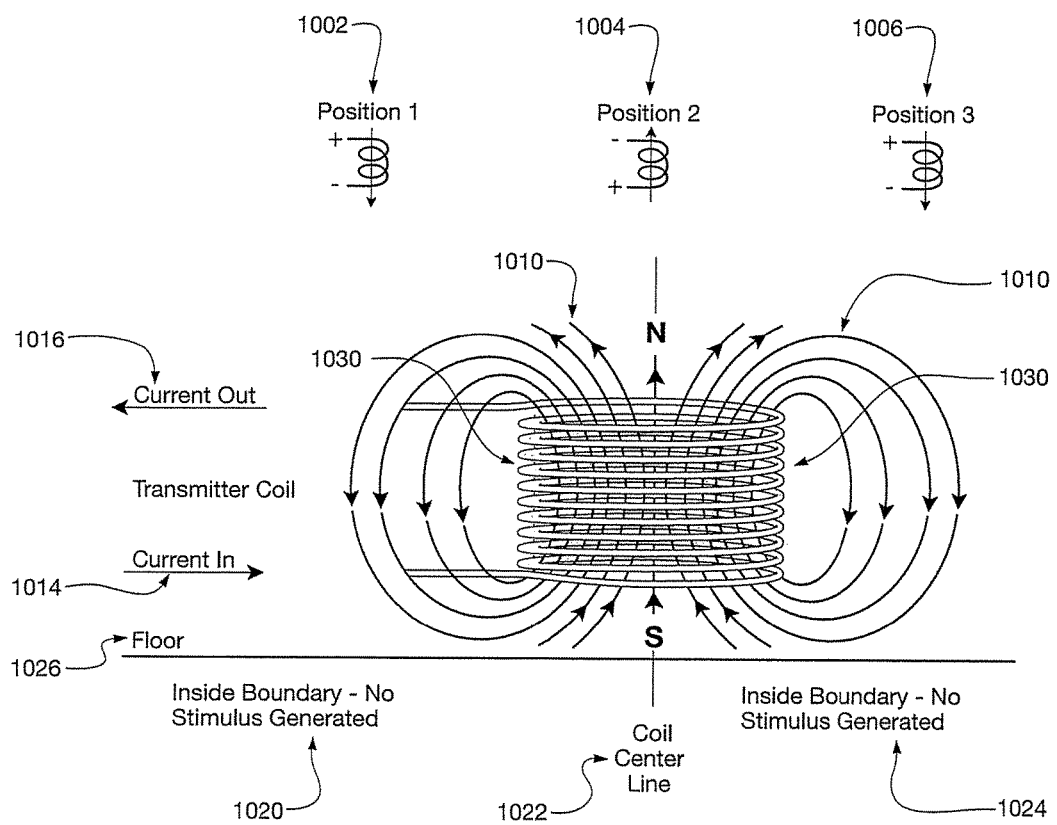
FIG. 10 shows a magnetic field generated using a horizontal circular coil under an embodiment.

A standard avoidance transmitter uses a circular transmitter coil 1030 to generate a magnetic field as shown in FIG. 10. Current enters the transmitter coil at 1014 and exits the transmitter coil at 1016. FIG. 10 shows the orientation of a floor line 1026 with respect to the coil center line shown at 1022. As a receiver coil (1002, 1004, and 1006) passes over the transmitter coil, the magnetic lines of flux 1010 generated by the transmitter coil pass through the receiver coil at corresponding receiver positions 1002, 1004, and 1006 and generate an output signal and polarity associated with the direction of the magnetic flux lines. If the coil design were utilized in a threshold application, the following receiver performance characteristics would occur. As observed in FIG. 10, as the receiver coil passes over the transmitter coil there are two reversals of the magnetic flux lines from the initial direction. As the receiver enters the field of the transmitter coil, the polarity of the receiver coil output at position 1 (1002) is + to −. As the receiver moves to position 2 (1004) at the center of the transmitter coil, the receiver output polarity reverses to a − to + configuration. At this point the receiver as described above with reference to the outdoor containment system would generate a correction stimulus output. As the receiver continues to move across the transmitter coil to position 3 (1006), the flux lines reverse again and the receiver coil output reverses again to that of position 1 (1002), + to −. As a result the correction stimulus output of the receiver would stop as the detected polarity is identical to that of the Inside Boundary area 1020. Therefore, the receiver coil output polarity as it enters the transmitter coil signal field is the same polarity as it exits the transmitter signal field. This would appear to the receiver internal logic that the animal had crossed back into an Inside Boundary area 1024 and the correction stimulus would cease.

In order for a receiver (as described above with reference to the outdoor containment system) to operate properly when it traverses a threshold, the receiver coil signal polarity must under an embodiment only reverse once. The magnetic field generated by the threshold must be fairly uniform and traveling in one direction. To generate a field of this type, within the small height requirements of a doorway threshold, a unique coil design is required.

This document describes a coil design configuration that provides a uniform magnetic field allowing the transmitted signal and receiver requirements of the outdoor containment system to be utilized to provide a linear, short length threshold barrier function to block animal entrance/exit through doors, hallways, stairways, etc.

Figure 11:
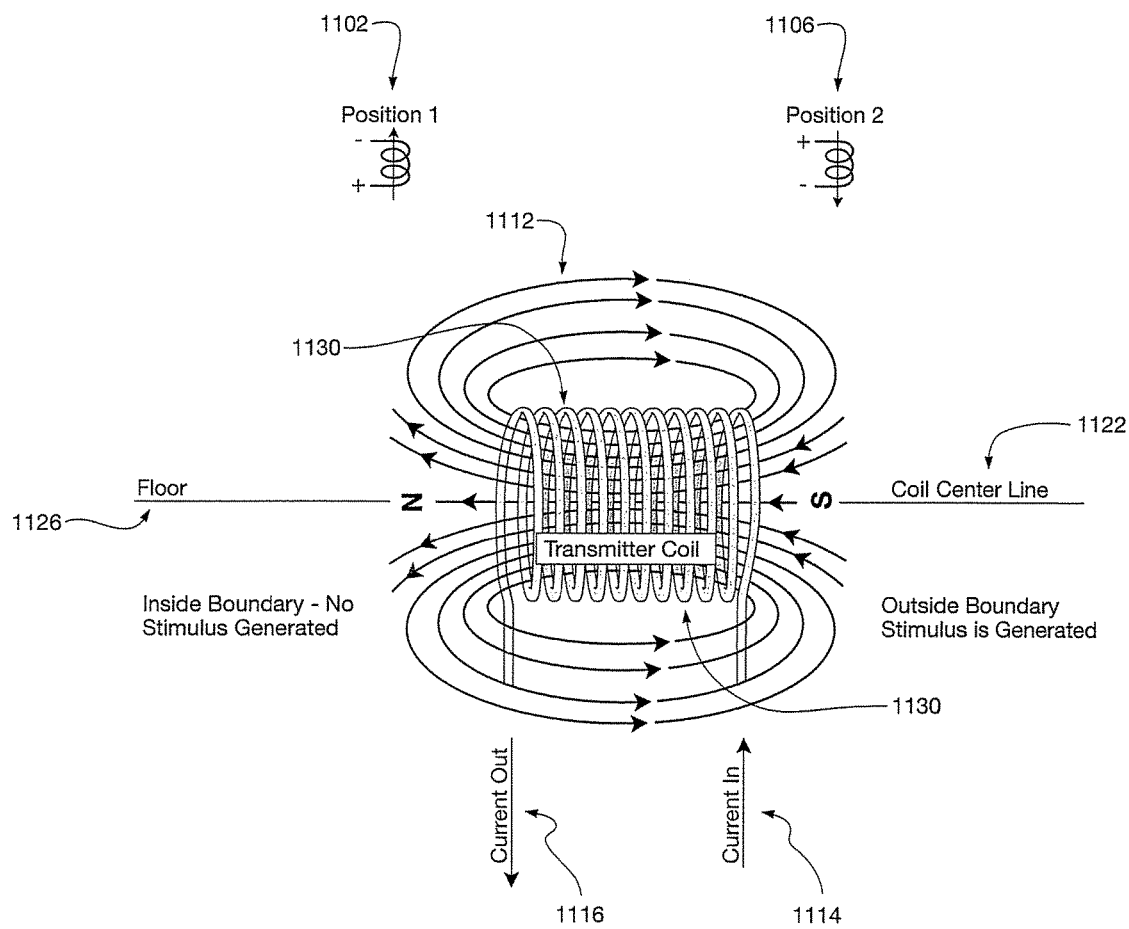
FIG. 11 shows characteristics of a magnetic field traveling in one direction generated using a coil in a horizontal position under an embodiment.

To generate a magnetic field with the proper characteristic of the magnetic field traveling in one direction, the coil generating the magnetic field must be rotated to a horizontal position as shown in FIG. 11 under an embodiment.

As indicated above, FIG. 11 shows a transmitter coil 1130 which generates a magnetic field with the proper characteristics of a magnetic field 1112 travelling in one direction. Current enters the transmitter coil at 1114 and exits the transmitter coil at 1116. FIG. 11 shows the orientation of the floor 1126 with respect to the coil center line shown at 1122. FIG. 11 shows that the center line of the coil is approximately parallel to the floor.

With this type of configuration, as a receiver (1102, 1106) passes over the transmitter coil, the magnetic lines of flux generated by the transmitter coil pass through the receiver coil and generate an output signal and polarity associated with the direction of the magnetic flux lines. As the receiver enters the field of the transmitter coil, the polarity of the receiver coil output at receiver position 1 (1102) is − to +. As the receiver moves to receiver position 2 (1106) at the right of the transmitter coil, the receiver output polarity reverses to + to −. At this point, the receiver described above with respect to the outdoor containment system would generate the desired correction stimulus output. Continuing beyond the transmitter coil the direction of the magnetic flux lines is still in the same direction and the polarity of the receiver coil output remains unchanged. Therefore the receiver stimulus output continues to be generated, creating the desired containment/barrier function. Obviously the same style large diameter coil used in a standard avoidance system is not acceptable for use in this application since the height of the coil would not be conducive for an individual to walk over without it being a trip hazard.

A new coil design was developed to eliminate the trip hazard height problem. A flat antenna coil was developed to accommodate the requirements for generating a uniform magnetic field. The design of the coil is shown in FIGS. 12A-12E. The coil utilizes a single layer of wire, uniformly wound around a 0.25 inch non-magnetic plastic core material as shown in FIGS. 12A-12E under an embodiment. The core may include fiberglass material. The coil comprises under one embodiment 18 gauge wire wound flat side by side around such core in a configuration of 75 turns (FIGS. 12C and 12D, 1240). The 0.25 inch aperture of the coil is sufficient to generate a magnetic field that is detectable by the receiver at heights up to 6 feet above the coil. The thin design of the coil allows for the completed design of the coil and surrounding plastic housing to be no more than 0.5 inches in height, significantly reducing the trip hazard occurrence of other coil designs. The overall length of the coil can be increased or decreased as necessary to accommodate the expanse required to create the animal barrier. The length of the coil may be placed on a floor and aligned with a threshold to define the inner and outer boundary described above with reference to FIG. 11. The center line of the coil is under an embodiment approximately orthogonal to a plane defining an inner boundary and an outer boundary as seen in FIG. 11. Under an alternative embodiment, magnetic material may be incorporated into (or replace) the non-magnetic material of the plastic core to adjust the overall inductance of the coil to improve its performance within the threshold barrier system.

Figure 12A:
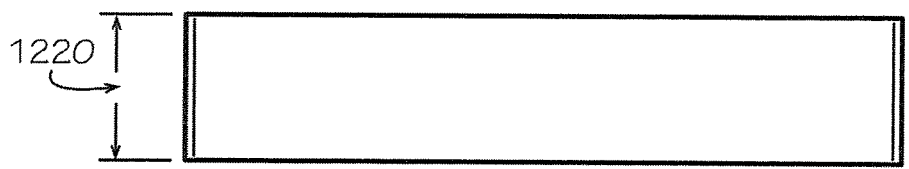
FIG. 12A shows a top down view of a flat antenna coil developed to accommodate the requirements for generating a uniform magnetic field under an embodiment.
Figure 12B:
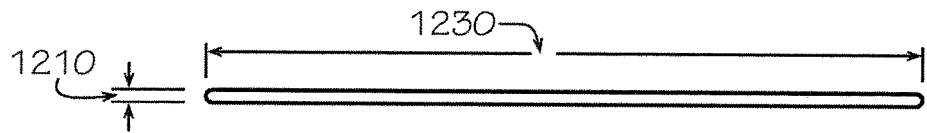
FIG. 12B shows a front view of a flat antenna coil developed to accommodate the requirements for generating a uniform magnetic field under an embodiment. The width 1220 of the coil shown in FIG. 12A extends into the page in FIG. 12B.
Figure 12C:
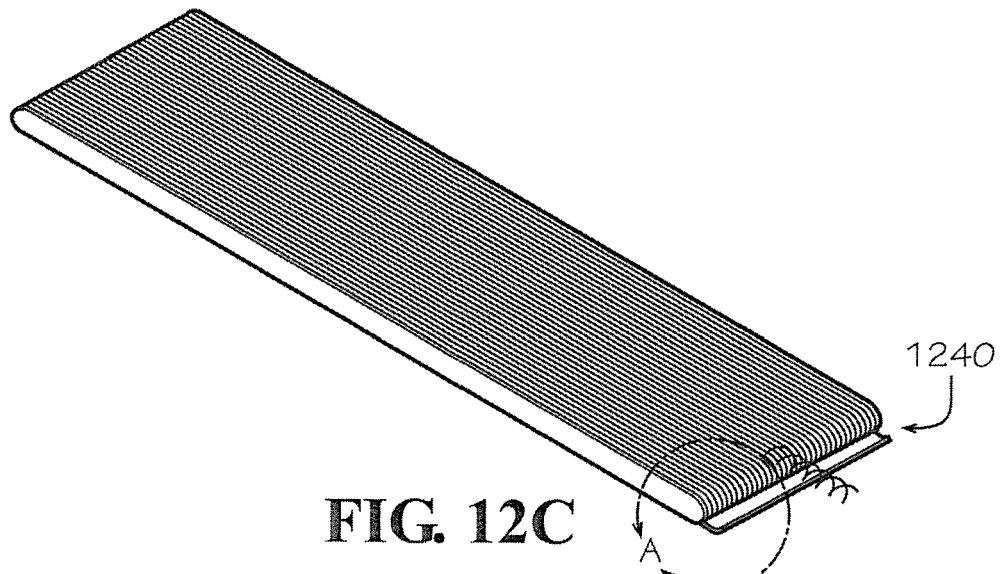
FIG. 12C shows a perspective view of a flat antenna coil wound with wire under an embodiment.
Figure 12D:
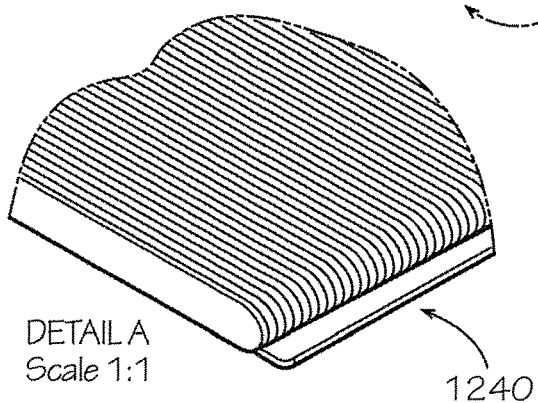
FIG. 12D shows a close up of the area marked "A" in FIG. 12C under an embodiment.
Figure 12E:
FIG. 12E shows a front view of a flat antenna coil wound with wire under an embodiment. The width 1220 of the coil shown in FIG. 12A extends into the page in FIG. 12E.

As seen in FIGS. 12A and 12B, the coil may include an aperture 1210 of approximately 0.250 inches (or 6.35 mm), a width 1220 of approximately 2.4 inches (or 60.96 mm), and a length 1230 of approximately 16.742 inches (or 425.25 mm). Under one embodiment, the surface of the coil does not vary more than 1.5 mm over the entire surface of such coil.

It should be noted that a transmitted signal through a coil of a threshold barrier system is under one embodiment an AC signal. Accordingly, the polarity of the corresponding magnetic field will reverse with each ½ cycle of the AC signal. This magnetic field is a single magnetic field but the magnetic lines of flux generated are bi-directional due to the AC excitation signal. Systems and methods of polarity detection relative to a magnetic field generated by an AC signal have been described above and may under an embodiment also be used to implement a system/method of polarity detection relative to one or more coils of a threshold barrier system.

Figure 13:
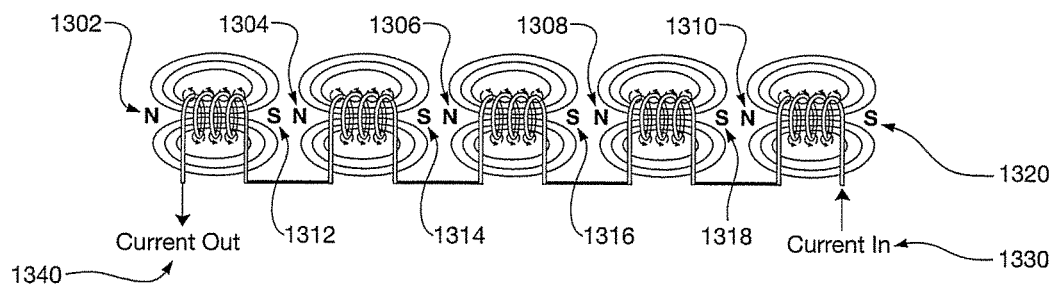
FIG. 13 shows multiple coils wired in series used to generate a magnetic field under an embodiment.
Figure 14:
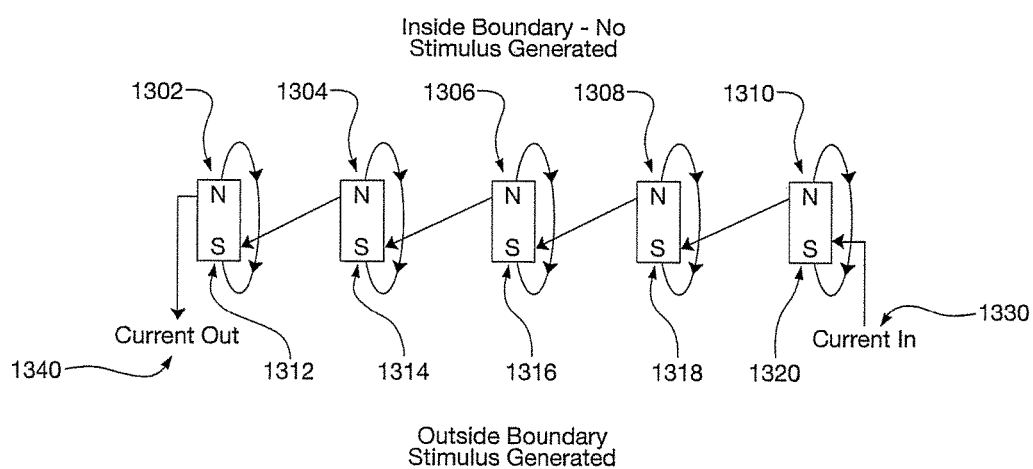
FIG. 14 shows physical arrangement of coils wired in series and used to generate a magnetic field under an embodiment.

In addition to the single flat coil embodiment described above, the generation of the uniform direction magnetic flux lines can be generated under an alternative embodiment using multiple smaller coils wired in series. The coil wiring polarity must be known and identified for each of the smaller coils, as the positive of one coil must be connected to the negative terminal of the next in order to insure that the magnetic field out of each coil is in the same direction. Electrically the coils are wired as shown in FIG. 13. Current enters the coil configuration show in FIG. 13 at 1330 and exits the coil configuration at 1340. The number of turns in each coil and spacing between coils may of course vary. Each coil includes a north pole (or terminal) 1302, 1304, 1306, 1308, 1310. As seen in FIG. 13, magnetic flux lines exit each coil at a corresponding north pole 1302, 1304, 1306, 1308, 1310. Each coil includes a south pole (or terminal) 1312, 1314, 1316, 1318, 1320. Magnetic flux lines enter each coil at a corresponding south pole 1312, 1314, 1316, 1318, 1320. The coils must be physically arranged as shown in FIG. 14 to achieve an orientation between floor line and coil center lines analogous to the orientation of floor and coil line shown in FIG. 11. As described above, the spacing between the inductors and number of turns would be dependent on the magnetic field desired to be generated within each inductor. Preliminary tests with this configuration indicated the inductor spacing could be in the 12 inch to 18 inch range but embodiments are not so limited.

Figure 15:
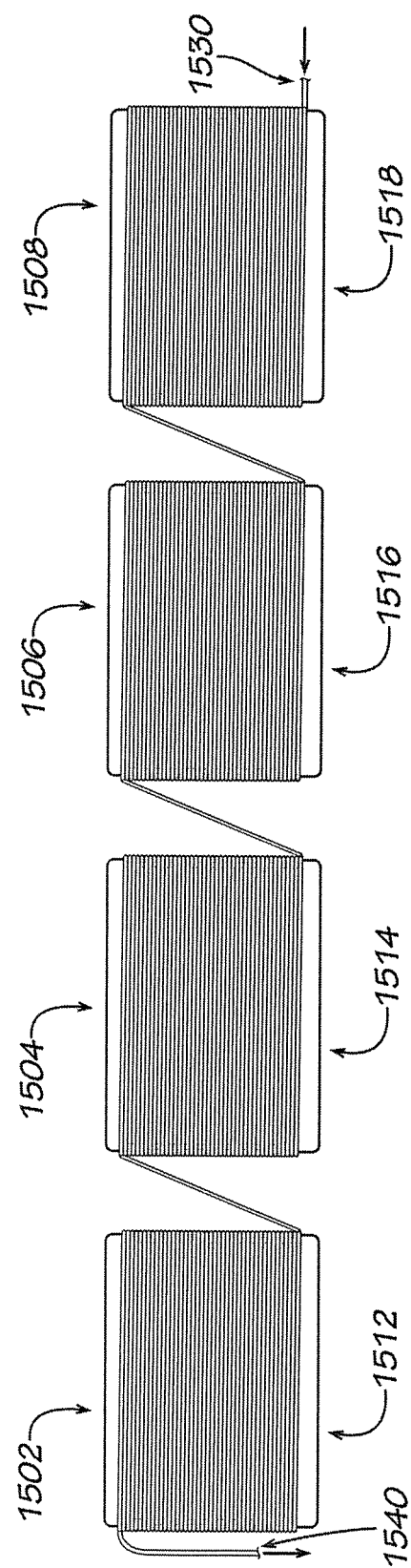
FIG. 15 shows multiple coils wired in series and used to generate a magnetic field under an embodiment.

FIG. 15 shows four coils wired in series to provide a threshold barrier system. Current enters the multiple coil configuration shown in FIG. 15 at 1530 and exits the multiple coil configuration at 1540. Each of the coils includes a north pole (or terminal) 1502, 1504, 1506, 1508. Magnetic flux lines exit each coil at a corresponding north pole 1502, 1504, 1506, 1508. Each of the coils includes a south pole (or terminal) 1512, 1514, 1516, 1518. Magnetic flux lines enter each coil at a corresponding south pole 1512, 1514, 1516, 1518. The coils must be physically arranged as shown in FIG. 15 to achieve an orientation between floor line and coil center lines analogous to the orientation of floor and coil line shown in FIG. 11.

As seen in FIG. 15, each coil represents a wire uniformly wound around a corresponding thin rectangular strip of material. Under one embodiment, each such strip comprises a height (corresponding to aperture of each coil) of approximately 0.250 inches (or 6.35 mm), a width of approximately 3.0 inches (or 76.2 mm), and a length of approximately 3.9 inches (or 99.06 mm). Note that under this embodiment the width of the strip (approximately 3.0 inches or 76.2 mm) is slightly larger than the width of the coil itself (approximately 2.4 inches or 60.96 mm). The spacing between the coils is approximately 0.5 inches (or 12.7 mm). Under an embodiment, each coil comprises 20 gauge wire wound around a corresponding thin rectangular strip in a configuration of 60 turns. The coils are of course wired in series as shown in FIG. 15.

As already indicated above, a threshold barrier system (comprising a single coil or multiple coils wired in series)

may be placed on a floor and aligned with a threshold to define inner and outer boundary spaces. However, it should be noted that one or more threshold barrier systems may be placed along a straight line boundary to define inner and outer boundary spaces in varying locations. As just one example, multiple barrier systems may be placed end to end to define a straight line boundary from wall to wall across a room and to establish a containment area within the room.

The receiver used in the above threshold barrier system described above may include a means to report its "whereabouts" in a premises. Similar to the outdoor containment system, a transmitter component of an indoor threshold system modulates binary data onto carrier signals in the form of an activation signal. Note that the transmitter components may include a signal generator, signal generator processor, and/or a modulator analogous or identical to the components of the signal generator described above with respect to the outdoor containment system described above. The modulated activation signal is transmitted on/through a flat coil wire embodiment of the threshold barrier system. The modulated signal includes an amplitude emphasis on select data bits to facilitate detection of a signal polarity near the barrier coils. The receiver detects the magnetic field of the transmitted signal using multiple inductor antennas. The receiver detects a polarity and applies a stimulus to an animal if a receiver (worn by the animal) is beyond a threshold (i.e. in position 2 with reference to FIG. 11). A stimulus may be applied to the animal until it returns to a position within the threshold (i.e. to position 1 with reference to FIG. 11).

Under an embodiment, the activation signal may also encode information regarding the identity of one or more on-premises threshold barrier coils to facilitate collection and use of positioning information. For example, a user of a threshold barrier system may place threshold barrier coils at various locations in a premises. Each corresponding transmitter component may encode (and subsequently modulate onto carrier waves) series of identifying bits which specifically identify a particular coil or threshold barrier. Assume that a user has placed a transmitter coil near an interior doorway separating a living room and a bedroom. As part of its routine and periodic data transmissions, the transmitter also transmits self-identifying data packets. The activation signal therefore identifies its source transmitter. Under such embodiment, a receiver worn by an animal may also be wirelessly coupled to a LAN which is then further coupled to a WAN. The coupling to a WAN may provide communications between a receiver and a remote server. When a receiver crosses a boundary and registers a reversal of polarity, the receiver may simultaneously register the identifying data of the transmitting coil and pass identifying data and polarity information to the remote server along with a timestamp corresponding to the moment a receiver detects the reversal of polarity. Based on initial configuration parameters established upon installation of the threshold barrier system, a remote server may lookup an on-premises location that corresponds to the identified coil. Accordingly, the remote server may use polarity indications relative to a barrier coil to determine a position of an animal/receiver in a premises.

Due to periodic transmission of a barrier specific activation signals, real time tracking of positioning data is possible. As another example, a pet wearing a receiver may simply be in the vicinity of or passing by a threshold barrier coil. In such case, the corresponding activation signal reports a detected polarity along with identifying data of the particular threshold barrier coil. The polarity indication along with transmitter identification provides positioning information of a receiver relative to the on-premises location of the corresponding transmitter. Such positioning information in cooperation with remotely stored configuration data and/or lookup tables would indicate (as one example) that a pet is inside a room and near a barrier coil placed near a door. The receiver under an embodiment periodically forwards such positioning information and polarity information to remote server applications. Accordingly, a remote server may monitor and report a position of an animal relative to on-premises barrier locations in real time based on threshold/receiver polarity indications and threshold crossing events and provide such pet location data to mobile computing platforms for real time viewing/access by system users.

The monitoring and detection functionality of the disclosed embodiments may also improve the function and performance of corresponding products. For example, assume that an owner equips a house with a battery powered gate for unimpeded pet ingress/egress functionality. The pet gate or ingress/egress system may automatically open the door when proximity of the pet to the door is detected. A threshold barrier coil of an indoor threshold barrier system may under an embodiment be placed near the same door or alternatively be integrated as part of the pet door itself. Accordingly, a receiver passing through a field generated by the barrier coil registers a reversed polarity (i.e. registers the event of the pet passing through the pet door) and may transmit polarity information (i.e. information of a detection event) and identifying information of the corresponding barrier coil to a remote server. Assume also that components of the ingress/egress system are communicatively coupled through LAN/WAN connectivity with the remote server of the embodiments described herein, i.e. to the remote server that tracks position data of a receiver relative to barrier locations of a barrier threshold system. The remote server may therefore serve location information of the receiver/pet to the ingress/egress system. Accordingly, when a pet is indoors (i.e. has not exited the pet door and has not triggered a threshold crossing event of a corresponding/integrated barrier coil), the ingress/egress system may conserve battery power by reducing the number of times it searches for a nearby pet. However, when a pet exits the gate (i.e., exits the pet door and triggers a threshold crossing event of a corresponding/integrated barrier coil), the ingress/egress system may then increase the frequency by which it searches for the location of the pet under the assumption that the pet will spend a brief amount of time outdoors and then return to the gate. In an alternative embodiment, the receiver and ingress/egress system may achieve similar functionality via a direct communications coupling between the receiver and component of the pet door.

One or more applications running on a remote server of an embodiment discussed above may also provide a threshold barrier system interface accessible to clients via mobile computing platforms (e.g., smartphones and tablet). The interface may provide a visual representation of pet location in a premises based on received polarity indications and barrier coil identification information. Further, the interface may present status information of each barrier coil in a threshold barrier system along with configuration options. As one example, a user may select a particular transmitter coil and define an "UP" period (or transmitting period) and a "DOWN" period (or non-transmitting period). The remote server may then serve UP/DOWN status data to the corresponding transmitter (or rather a transmitter component may routinely poll the remote server in order to retrieve such status information). Accordingly, a user may then enable/disable pet access to particular areas by enabling/disabling the transmission activity of a barrier coil corresponding to such areas. Under an alternative embodiment, the remote server may directly communicate "UP" or "DOWN" status information to a receiver of a threshold barrier system. In "UP" status, a stimulus is to be applied. In "DOWN" status, no stimulus is to be applied. Under this embodiment, a user may define an "UP" or "DOWN" status for a receiver relative to any transmitter coil of the threshold barrier system for selected periods of time. If the receiver detects a threshold crossing event, the receiver applies a stimulus when in "UP" mode and does not apply the stimulus in "DOWN MODE".

A user may simply disable a stimulus generator component of a receiver. As described above, when a receiver crosses a particular threshold boundary/coil and detects a reversal of polarity, the receiver may simultaneously register the identifying data of the transmitting coil. The collar may transmit the identifying data, polarity indication, and time-stamp to a remote server which may under one embodiment lookup corresponding configuration data provided by the user. The user may have disabled the stimulus generator component of a receiver with respect to such barrier coil at the particular time (i.e. placed the receiver in a "DOWN" state). The remote server returns to the receiver a data signal indicating a "DOWN" state. Accordingly, the receiver delivers no stimulus.

In contrast to the outdoor containment system which may use AC source to power an outdoor perimeter wire, the indoor threshold containment system requires distribution of transmitter coils throughout a premises which may not be convenient to an AC source. Thus, a battery powered transmitter is necessary in these and other situations. In contrast to the indoor avoidance systems described above (that use transmitters to emit a circular magnetic field), a signal generator as implemented in an embodiment of the indoor threshold containment system must transmit data at a very high rate in order for the system receiver to successfully detect polarity of a signal emitted by a transmitter coil of the embodiment.

As discussed above, transmitters of a standard avoidance system (generating a circular magnetic field) require a relatively low packet transmit rate and can have a battery life of 30 days or more. In a threshold barrier system, there is a need to send signal packets at a much higher rate to achieve the desired function, causing battery life to be very undesirable without using a large battery that would be very cost prohibitive. The need for increased transmission rates relate to the manner in which a receiver interacts with a threshold barrier coil to detect a crossing event. Given the strength of the field generated by the flat coil, a receiver/animal may quickly pass through or by the generated field without detecting a polarity of the magnetic field. This is because a receiver of an embodiment requires a certain number of data packets in order to confirm a polarity indication of a detected magnetic field. If the transmitter component associated with a particular threshold barrier does not transmit data packets at a sufficient rate, the receiver may not receive sufficient data to identify a polarity (or polarity shift) as a receiver/animal passes by a threshold barrier magnetic field. In other words, increased transmission rates facilitate a receiver's accurate detection of a barrier coil magnetic field and thereby increases the reliability of the indoor threshold barrier system.

As described above, increased transmission rates increase reliability of the threshold barrier system but also drains battery power. Under one embodiment, a transmitter component of a threshold barrier system may use PIR (passive infrared) motion sensing device to detect movement of an animal in the proximity of a particular barrier coil before transmitting. The transmitter could be completely off, then wake up and start transmitting at a high rate when motion is detected in the close proximity. Some of the advantages of this approach are very low idle power consumption (when PIR motion sensing device is enabled). A pet collar receiver would appear to have very quick response when approaching the transmitting device, since the transmitter can transmit at a high rate after detecting motion. One skilled in the art will recognize that the detection of motion is not limited to the use of PIR sensing devices. Other technologies can also be utilized for detecting motion. These technologies may include, but are not limited to doppler microwave detectors and capacitive proximity sensors.

A transmitter is normally placed on the floor. At least one motion detection device is integrated into the upper surface of the transmitting device. The transmitter can be in a very low duty cycle (or slow transmit rate) or completely off when motion is not detected in the immediate vicinity of the transmitting device. The transmitter will transition to a higher duty cycle state or turn on only after motion is detected in the near vicinity. The higher duty cycle state will timeout after a time period or timeout when detected motion stops occurring. Example power consumption figures comprise:

TABLE 1

Comparison of transmitter continuous transmission operation verses motion detected operation

| Transmission Packet Rate (Tx/Sec) | 3 | 6 | 12 | 16 | 32 | 60 |
|---|---|---|---|---|---|---|
| Maximum pet rate of speed for receiver detection (mile per hour) | 1.06 | 2.13 | 4.26 | 5.68 | 11.35 | 21.29 |
| Average Battery Supply Current (mAmp) | 0.91 | 1.62 | 3.07 | 3.98 | 7.5 | 13.4 |
| Typical battery operational life based on 1.9 AHr battery capacity (Days) | 87 | 48.8 | 25.8 | 19.9 | 10.5 | 5.9 |
| Typical battery operational life based on PIR motion detected operation assuming 20% motion detection per day (Days) | 435 | 244 | 128.9 | 99.6 | 52.7 | 29.5 |

Table 1 provides power consumption figures for a 1.9 AHr DC battery cell providing power to the transmitter under an assumption that maximum operational field height of a transmitter receiver system is 34 inches. The table provides packet transmission rate, maximum speed of the pet for receiver detection of the transmitted signal, the average battery supply current, and the typical battery life for both continuous operation and 20% operation based on a PIR motion sensor. The data set forth above corresponds to an embodiment of the transmitter shown in FIGS. 12A-12E. However, it should be noted that there would be no significant difference between the performance of the FIGS. 12A-12E and FIG. 15 coil designs.

The data of Table 1 is intended to show how significant the power savings can be when PIR motion sensing is used to trigger signal transmission. If approximately 20% motion per day is assumed, performance (via activation of transmitter using PIR motion sensing with respect to a high speed pet) may be increased by approximately 5 times. For example, if a 60 tx/sec transmission rate is required and motion is detected for approximately 4.8 hours per day, battery life of a transmitter using a PIR motion sensing is 29.5 days while a transmitter without PIR motion sensing is approximately 5.9 days (i.e. approximately 5 times less).

Under another embodiment, power consumption figures comprise:

TABLE 2

| Collar height (inch) | total distance in field (inch) | 3tx/Sec MPH | 6tx/sec MPH | 12tx/sec MPH | 16tx/Sec MPH | 30tx/Sec MPH | 59tx/Sec MPH |
|---|---|---|---|---|---|---|---|
| Transmitting Continuously at specified packet rate: | | | | | | | |
| 24 | 56.2 | 1.06 | 2.12879 | 4.25758 | 5.67677 | 10.6 | 20.85 |
| Battery Life (Days) | | 51 | 26 | 13 | 9 | 5 | 2.5 |
| Motion detected for 4.8 hours each day: | | | | | | | |
| 24 | 56.2 | 1.06 | 2.12879 | 4.25758 | 5.67677 | 10.6 | 20.85 |
| Battery Life (Days) | | 255 | 130 | 65 | 45 | 25 | 13 |

Table 2 provides power consumption figures under conditions similar to Table 1. Under this embodiment, the table above provides power consumption figures for a DC battery cell providing power to the transmitter under an assumption that maximum operational field height of a transmitter receiver system is 34 inches. The table provides "collar height", "total distance in field" and "tx/sec MPH" information. The "collar height" indicates the distance (inch) of the collar receiver from the floor. Note that in contrast to Table 1, this table assumes that the collar height is at 24 inches as opposed to 34 inches. The "total distance in field" indicates a range in which a receiver may detect the generated magnetic field of a flat coil as the receiver passes through the magnetic field generated by such coil. A total distance of 56.2 inches means that from point of detection on one side of a generated field to loss of signal on the other side, a receiver travels a total of 56.2 inches through the field. The "tx/sec MPH" field correlates a transmission rate of a transmitter with a threshold velocity of a receiver (i.e. animal) passing through a corresponding magnetic field above which the receiver may no longer detect polarity information of such magnetic field. The data set forth above corresponds to an embodiment of the transmitter shown in FIGS. 12A-12E. However, there would be no significant difference between the performance of the FIGS. 12A-12E and FIG. 15 coil designs. It should be noted that the figures of Table 2 are derived from preliminary data collection efforts.

The data of Table 1 set forth above is intended to show how significant the power savings can be when PIR motion sensing is used to trigger signal transmission. If approximately 20% motion per day is assumed, performance (via activation of transmitter using PIR motion sensing with respect to a high speed pet) may be increased by approximately 5 times. For example, if a 59 tx/sec transmission rate is required and motion is detected for approximately 4.8 hours per day, battery life of a transmitter using a PIR motion sensing is 13 days while a transmitter without PIR motion sensing (i.e. transmitting continuously) is approximately 2.5 days (i.e. approximately 5 times less).

Systems. methods, and devices are described herein for determining the polarity of the signal transmitted by an animal containment system. An embodiment describes containment of an animal by using a boundary wire typically buried around the perimeter of an individual's property, as illustrated in FIG. 1 and corresponding disclosure set forth herein. A modulated signal is transmitted on a boundary wire, and the modulated signal includes an amplitude emphasis on select data bits for use by a receive to detect the signal polarity. A receive may then use signal polarity to infer a position of the receive relative to the boundary wire.

The receiver detects the magnetic field of the transmitted signal using multiple inductor antennas. The receiver is able to determine which side of the boundary wire the receiver is located by the polarity of the voltage induced within the inductor antenna.

Positional Meaning Relative to Signal Polarity

U.S. Pat. No. 8,047,161 (the '161 patent) describes a methodology and devices for determining the polarity of a signal transmitted by an animal containment system. The '161 patent describes containment of an animal using a boundary wire typically buried around the perimeter of an individual's property as illustrated in FIG. 1. A modulated signal is transmitted on the boundary wire that includes an amplitude emphasis on select data bits for use by the receiver in detecting the signal polarity about the boundary wire. The receiver detects the magnetic field of the transmitted signal using multiple inductor antennas. The receiver is able to determine which side of the boundary wire the receiver is located by the polarity of the voltage induced within the inductor antenna.

Numerous issued Untied States patents (including U.S. Pat. Nos. 7,046,152; 7,068,174; 7,117,822; 7,204,204; 7,278,376; 7,495,570; and 8,342,135) describe an avoidance barrier system designed to transmit a circular magnetic signal that repels and keep animals away from a transmitter. These devices are typically used inside the home to keep pets off of furniture and/or prevent them from entering or leaving a room. In contrast to an avoidance barrier approach, the systems and methods described herein disclose a threshold barrier system which utilizes the magnetic field technology of the outdoor containment system disclosed in the '161 patent. However, the threshold barrier system implements the magnetic field technology without the need for a perimeter boundary wire (see FIGS. 10 to 15 and corresponding disclosure material).

Figure 16:
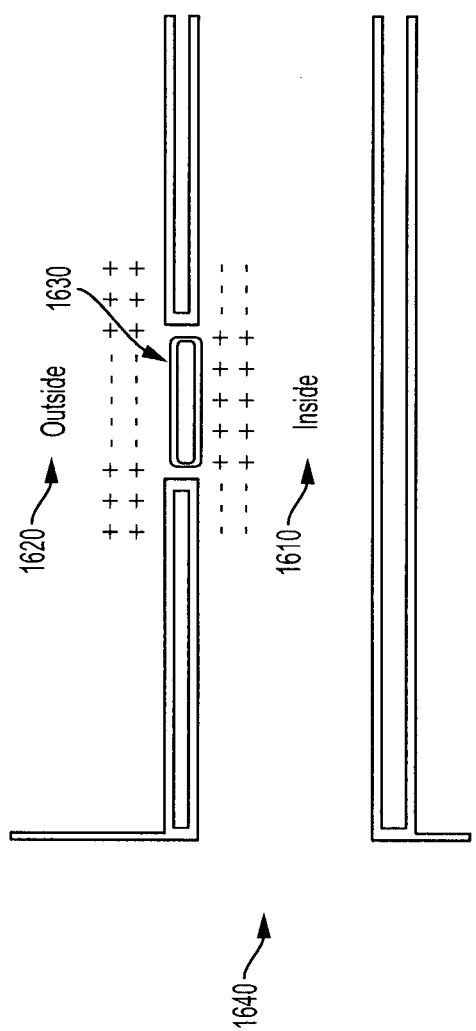
FIG. 16 shows inside and outside regions relative to a transmitter placed in doorway, under an embodiment.

Irrespective of the means for generating a magnetic field, a correct determination of signal polarity is a necessary condition for pet containment and avoidance functions. However, a correct determination of signal polarity is not always sufficient. For example, both positive and negative magnetic polarities may exist "inside" (FIG. 16, 1610) a containment/avoidance area. The same may be true for points "outside" (FIG. 16, 1620) said containment/avoidance area. FIG. 16 shows a boundary threshold transmitter 1630 located in a doorway along a hall 1640. The magnetic polarity on either side of the threshold is indicated with + and − symbols. If a pet walks down the hall, the receiver on its collar may encounter both positive (inside) and negative (outside) polarities. Accordingly the polarity indication alone is insufficient for use by the receiver in making a location determination, e.g., whether an animal is inside 1610 or outside 1620 relative to a threshold.

A receiver may therefore need the combined knowledge of both the correct polarity and whether that polarity reflects and "in" or an "out" presence. This combined knowledge is necessary and sufficient for a receiver to accurately infer the position of an animal and to implement avoidance decisions in containing/excluding pets from target areas. This approach avoids for example the false correction of animals or conversely the improper withholding of a correction.

Figure 17:
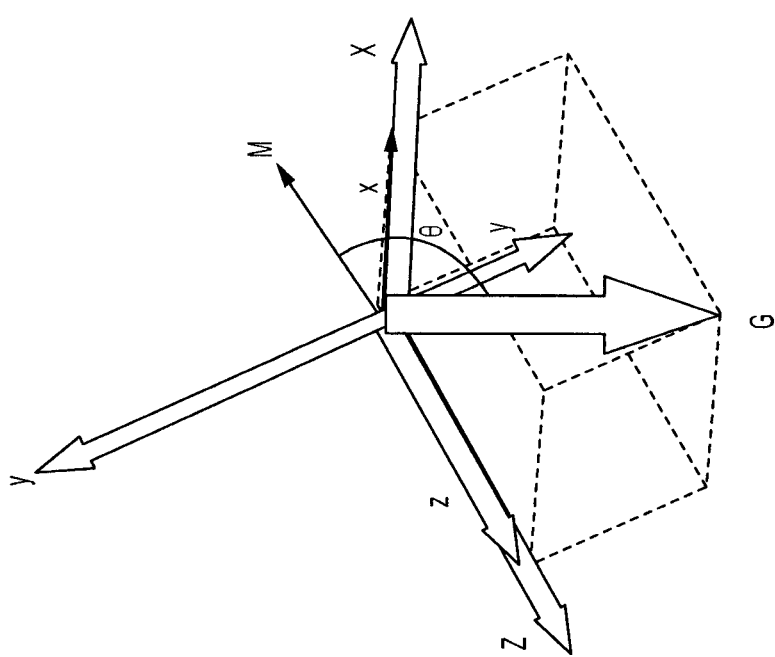
FIG. 17 shows the relationship between a magnetic field vector and a gravity vector, under an embodiment.

The magnetic field at a given point in 3-D space has a particular angle and magnitude, and is given by a 3-D vector called M. At the same point in space, another 3-D vector exists called G that reflects the angle and magnitude of a vector that is perpendicular to the surface below, e.g., the ground or a floor. For example, the gravity vector is vector G on a flat surface. The polarity of a magnetic signal at a given point in space only reflects or indicates that point's position relative to the source transmitter of that magnetic signal, e.g., a wire or coil, when the magnetic field's 3-D vector is sufficiently aligned with the vector that is perpendicular to the surface. As such, the angle between vector M and G can be used to measure the extent of alignment between the vectors and thereby to indicate whether polarity indicates an "in" position (1610) of a receive or "an" out position (1620) of a receiver. The lower the angle, the greater degree of alignment between M & G, and the more likely it is that detected polarity properly indicates the in/out position of the receiver relative to the source transmitter. FIG. 17 illustrates two such vectors and the angle between the vectors, θ (Theta).

Theta can be calculated directly using the following equation: $\theta = \cos^{-1}(M \cdot G / \|M\| \cdot \|G\|)$, which is the inverse cosine of the dot product of the two vectors divided by the product of their magnitudes. If theta is sufficiently small, this indicates that polarity is reflective of an in/out position of the receiver.

The embodiments described herein may use any way to calculate or estimate the values of the vectors and/or the angle between the vectors. For example, the gravity vector can be estimated using any combination of devices such as 3-axis accelerometers, gyroscopes, magnetometers, etc. Magnetic field vectors may be measured using magnetometers as just one example. Also, distance measurements between the vectors that are in any way proportional to the angle between them may also be used to indicate whether polarity correctly reflects a receiver's position.

If the two vectors (M and G) point in the same direction, that implies that the angle between them is small. Under an embodiment, the angle calculation may be performed indirectly. For example, if the vectors are assumed to originate at the center point of a sphere, each vector would intersect the sphere at a point. If one intersects at point A $(x_1, y_1, z_1)$ and the other at point B $(x_2, y_2, z_2)$, the distance between the points, AB, is given by the formula: $AB = \text{Sqrt}((x_2-x_1)^2 + (y_2-y_1)^2 + (z_2-z_1)^2)$. The distance between those points provides under embodiment an indirect measurement of the angle between the vectors. There is enough information here to compute θ as $$\cos^{-1}\left(\frac{r^2 + r^2 - AB^2}{2r}\right)$$

where r is the radius of the sphere. This is just one approach in obtaining indirect measurements of the angle between the vectors. Comparable indirect measurements may be implemented in accordance with the systems and methods described herein.

Variable Transmission Power

As indicated above, numerous issued Untied States patents (including U.S. Pat. Nos. 7,046,152; 7,068,174; 7,117,822; 7,204,204; 7,278,376; 7,495,570; and 8,342,135) describe an avoidance barrier system designed to transmit a circular magnetic signal that repels and keeps animals away from the transmitter. These devices are typically used inside the home to keep pets off of furniture and/or prevent them from entering or leaving a room. In contrast to an avoidance barrier approach, the systems and methods described herein disclose a threshold barrier system which utilizes the magnetic field technology of the outdoor containment system disclosed in U.S. Pat. No. 8,047,161 (the '161 patent). However, the threshold barrier system implements the magnetic field technology without the need for a perimeter boundary wire (see FIGS. 10 to 15 and corresponding disclosure material).

The threshold barrier system described herein uses a receiver capable of detecting a magnet field polarity. The receiver only applies a stimulus when the receiver crosses over the threshold barrier causing the signal polarity of the magnet field to reverse in the inductor antennas. A threshold barrier may be used to contain a first animal to a defined space, i.e. a room, while keeping a second animal out of the same space. The threshold barrier approach allows the first animal to utilize the full extent of the room. The first animal does not receive a stimulus until the animal crosses over the threshold barrier. Conversely, the threshold barrier prevents the second animal from entering the room. The threshold barrier approach allows the second animal the full extent of the hallway area without receiving a stimulus until crossing over the threshold barrier into the room. Also, since a receiver maintains a positive indication of a threshold crossing event, i.e. the applied stimulus continues until the animal crosses back over the threshold. With the threshold barrier system, the animal cannot escape by simply running through the signal field.

The threshold barrier system described herein provides a signal field amplitude that is adjusted so that the received signal activates a receiver on a dog's neck that passes through the transmitted field at a given height. As the particular animal increases in height, the signal field amplitude must be increased in order to interact with and activate functionality of the receiver. A problem may occur when two dogs of differing heights are contained by a single threshold barrier device or source transmitter. Note that the strength of a magnetic field transmitted by the threshold device decreases at rate proportional to distance cubed where distance is the distance from the source transmitter. The typical receivers used for this application do not have a wide enough dynamic signal range to operate at all of the varying heights above the transmitter when the transmitter is set to higher output levels. As a result receiver amplifier circuitry may can go into saturation and cease to function as desired when the transmitter is set to a higher level to accommodate the height of a tall dog and when a short dog (and its receiver collar) crosses the transmitter (i.e., passes through the field). With the receiver amplifiers in saturation a dog is able to walk across the threshold transmitter without receiving a correction. In addition the taller dog could similarly defeat the containment system by simply lowering its head, placing the receiver in the stronger field and saturating the receiver amplifiers of the animal's receiver collar.

An improvement to a threshold transmitter of a threshold barrier is system is described for providing a transmitter capable of generating a signal that works with receivers at any height when the transmitter is set to its highest power level setting.

Table 1 set forth above describes a transmitter with variable transmission rates of 3 to 60 transmissions per second. The higher the transmission rate the greater the receiver's detection accuracy and reliability. The transmissions described with respect to the threshold barrier system are adjustable in amplitude but once the amplitude is set each transmission data packet is identical and of equal amplitude. As already indicated above, transmissions that are of a sufficient level for detection by a receiver worn by a tall dog may saturate the receiver worn by a shorter dog. To overcome this receiver operational height barrier, lower amplitude level transmission data packets may be interleaved with higher level amplitude transmission data packets. This approach allows receivers at a shorter height to receive an acceptable signal from the lower amplitude transmissions that do not saturate the amplifiers.

It is obvious that the higher transmission level output is determined by the height of the receiver above the transmission antenna and by the corresponding sensitivity of the receiver circuitry. The transmission(s) of the lower amplitude levels (for lower height receivers) is a function of both the maximum sensitivity of receiver circuitry and the minimum level at which the receiver circuitry saturates and therefore becomes unusable. To be useful the transmission amplitudes must allow the receiver to operate up to the maximum setting of the transmitter output. This may require the use of multiple transmission amplitudes interleaved into the transmission signal. The current receiver sensitivity dynamic range (i.e., the dynamic range of a receiver used with respect to the threshold barrier system described above) coupled with the current maximum height of a corresponding transmitter (i.e., the maximum transmission amplitude that allows detection by a receiver at 28") allows the system described to operate effectively with only two separate signal transmission amplitudes. The two transmission levels are variable dependent on the level 1 thru 5 setting of the transmitter. The lowest level transmission for the 10" height does not include multiple transmission levels. For transmission levels 2 through 5 the lower level output is ⅕ the high level transmission. If the maximum operational height of the receiver were to increase significantly, this would necessitate a commensurate increase in the transmission amplitude, and additional transmission amplitudes may need to be interleaved into the transmission to allow a receiver to operate over the entire increased height.

The present system (transmitter and receiver) operates at 5 adjustable maximum height ranges (10", 15", 20", 24", and 28"). The present system transmits one low amplitude level signal every fifth transmission. The lowest level transmission for the 10" height does not include multiple transmission levels. For transmission levels 2 through 5 the lower level output is ⅕ the high level transmission. For example, level 2 comprises a transmission amplitude that may be detected at a max height of 15". The corresponding lower level output (transmitted every fifth transmission) is ⅕ the level 2 transmission amplitude. Also for the present system, operational heights greater than 28 inches would require at least one or more intermediate transmitter amplitude levels for proper operation.

U.S. patent application Ser. No. 14/549,023 is incorporated herein by reference in its entirety to the same extent as if included herein.

Embodiments described herein include a system comprising a transmitter unit and a receiver, the transmitter unit comprising a transmitter coil, a signal generator, and a modulator. The transmitter coil comprises a wire uniformly wound around a length of a thin strip of material. Embodiments described herein place the transmitter unit at a boundary. The signal generator generates an activation signal comprising digital data and the modulator modulates the activation signal onto carrier waves. The signal generator transmits the modulated activation signal through the transmitter coil, wherein the transmitting the modulated activation signal generates a uniform magnetic field within a region around the transmitter coil and defines a first detection area of the region and a second detection area of the region. The transmitting and the generating includes emphasizing a first portion of the carrier waves. The receiver travels through the region, wherein the receiver uses information of the emphasized first portion to detect a first polarity of the uniform magnetic field in the first detection area and a second polarity of the uniform magnetic field in the second detection area, the second polarity comprising a reversal of the first polarity.

The thin strip of material of an embodiment comprises non-magnetic material.

The thin strip of material of an embodiment comprises magnetic material.

The thin strip of material of an embodiment comprises a rectangular strip of material.

The length of the thin rectangular strip of material of an embodiment is approximately 16.7 inches.

A width of the thin rectangular strip of material of an embodiment is approximately 2.4 inches.

A height of the thin rectangular strip of material of an embodiment is approximately 0.25 inches, wherein the height corresponds to an aperture of the transmitter coil.

The uniformly wound wire of an embodiment comprises 18 gauge wire.

The uniformly wound wire of an embodiment comprises 20 gauge wire.

The uniformly wound wire of an embodiment is uniformly wound flat side by side around the length of the thin strip of material in a configuration of seventy five turns.

The uniformly wound wire of an embodiment is uniformly wound flat side by side around the length of the thin strip of material in a configuration of sixty turns.

The placing the transmitter unit of an embodiment at the boundary including placing the transmitter coil at the boundary.

The placing the transmitter coil of an embodiment at the boundary including aligning the length of the thin strip with the boundary.

The centerline of the transmitter coil of an embodiment is approximately orthogonal to a plane defining the first detection area and the second detection area.

The placing the transmitter unit of an embodiment at the boundary includes placing at least two transmitter units and corresponding transmitter coils at the boundary in an end to end configuration and aligning the lengths of the corresponding thin strips of material with the boundary, wherein the centerlines of the corresponding transmitter coils are approximately orthogonal to a plane defining the first detection area and the second detection area.

The boundary of an embodiment comprises a threshold.

The boundary of an embodiment comprises a straight line.

The thin strip of the material of an embodiment comprises a plurality of thin strips.

Each strip of the plurality of thin strips of an embodiment is rectangular.

A length of each strip of the plurality of thin strips of an embodiment is approximately 3.9 inches, a width of each strip of the plurality of thin strips of an embodiment is approximately 3 inches, and a height of each strip of the plurality of thin strips of an embodiment is approximately 0.25 inches.

The plurality of thin strips of an embodiment are aligned along their lengths and are spaced approximately 0.5 inches apart.

The transmitter coil of an embodiment comprises a plurality of coils, wherein each coil of the plurality of coils comprises a wire uniformly wound around a corresponding length of the plurality of thin strips.

The plurality of coils of an embodiment are wired in series.

The centerlines of the plurality of coils of an embodiment are approximately parallel with each other, wherein the centerlines of the plurality of coils are approximately orthogonal with a plane defining the first detection area and the second detection area.

The travelling through the region of an embodiment comprising passing over the transmitter coil.

The boundary of an embodiment defines the first detection area and the second detection area.

The flux lines of the uniform magnetic field of an embodiment travel along pathways in the first detection area corresponding to the first polarity.

The flux lines of the uniform magnetic field travel of an embodiment along pathways in the second detection area corresponding to the second polarity.

The receiver of an embodiment detects the first polarity comprising indicating a position of the receiver in the first detection area.

The receiver of an embodiment detects the second polarity comprising indicating a position of the receiver in the second detection area.

The receiver of an embodiment detects the second polarity indicating a first boundary crossing event.

The first boundary of an embodiment crosses event including the receiver transitioning through the boundary from the first detection area to the second detection area.

The receiver of an embodiment includes a stimulus generator, the stimulus generator applying a stimulus upon the receiver detecting the second polarity, the stimulus generator applying the stimulus until the receiver again detects the first polarity.

The applying the stimulus of an embodiment includes applying the stimulus to an animal wearing the receiver.

The receiver again detecting the first polarity of an embodiment comprises indicating a second boundary crossing event.

The second boundary crossing event of an embodiment includes the receiver transitioning through the boundary back from the second detection area to the first detection area.

The uniform magnetic field of an embodiment comprises a north pole and a south pole, wherein magnetic flux lines exit the transmitter coil proximate the north pole and enter the transmitter coil proximate the south pole.

The activation signal of an embodiment comprises operating instructions for the receiver, the operating instructions including one or more of identifying information of the transmitter coil and operational parameters of the receiver.

The digital data of an embodiment comprises a plurality of data packets.

The modulating the activation signal onto the carrier waves of an embodiment includes modulating each data packet of the plurality of data packets onto a corresponding plurality of carrier waves, the carrier waves including the corresponding plurality of carrier waves.

The emphasizing the first portion of the carrier waves of an embodiment includes emphasizing at least one portion of each corresponding plurality of carrier waves.

The at least one portion of each corresponding plurality of carrier waves of an embodiment comprises at least one initial carrier wave of the corresponding plurality of carrier waves.

The signal generator of an embodiment determines a direction for the at least one initial carrier wave.

The direction of the at least one initial carrier wave of an embodiment comprises a positive direction.

The transmitting the emphasized first portion of an embodiment including increasing a strength of the magnetic field corresponding to the at least one portion of each corresponding plurality of carrier waves.

The increasing the strength of the magnetic field of an embodiment comprises increasing the current driven through the transmitter coil when transmitting the emphasized first portion.

The increasing the current driven through the transmitter coil of an embodiment comprises increasing an amplitude of a corresponding induced voltage.

The receiver using information of the emphasized first portion of an embodiment to detect the first polarity and the second polarity, wherein the using the information includes one or more inductor coils of the receiver detecting the corresponding induced voltage.

The one or more inductor coils of an embodiment comprise three mutually orthogonal inductor coils, wherein the receiver uses a three axis accelerometer to determine the orientation of the one or more inductor coils relative to the three axis accelerometer.

The transmitter of an embodiment includes a motion sensing detection device.

The motion sensing device of an embodiment includes at least one of a passive infrared (PIR) motion sensing detection device, a doppler microwave radar motion sensing detection device, and a capacitive proximity sensing motion sensing detection device.

The signal generator of an embodiment transmits at either a high or low transmission rate.

The low transmission rate of an embodiment comprises no transmission.

The motion sensing detection device of an embodiment detects motion of one or more objects.

The one or more objects of an embodiment includes an animal wearing the receiver.

The motion sensing detection device of an embodiment detects the motion in a vicinity of the transmitter.

The vicinity of an embodiment includes at least a portion of the first detection area and the second detection area.

The vicinity of an embodiment includes the region.

The vicinity of an embodiment includes an area larger than the region.

The signal generator of an embodiment transitions from the low transmission rate to the high transmission rate when the motion sensing detection device detects the motion.

Each of the low transmission rate and the high transmission rate of an embodiment corresponds to a maximum rate of speed for detection of the one or more objects.

The maximum rate of speed for detection of an embodiment includes the rate of speed above which the receiver no longer detects sufficient information of the emphasized first portion to detect the first polarity and the second polarity.

The transitioning from the low transmission rate to the high transmission rate of an embodiment comprises increasing the maximum rate of speed for detection of the one or more objects.

The signal generator transitions from the high transmission rate to the low transmission rate of an embodiment when the motion sensing detection device detects no motion for a period of time.

The transitioning between transmission states of an embodiment using detected motion information of the motion sensing detection device increasing an operational life of a battery of the transmitter unit, wherein the transmission states include the low transmission rate and the high transmission rate.

The transitioning between transmission states of an embodiment using detected motion information of the motion sensing detection device increasing an operational life of a battery of the transmitter by approximately a factor of five.

Embodiments described herein include a system comprising a transmitter unit and a receiver, the transmitter unit comprising a transmitter coil, a signal generator, and a modulator. Embodiments described herein include placing the transmitter coil at a boundary. The signal generator of an embodiment generates an activation signal comprising digital data and the modulator modulating the activation signal onto carrier waves. The signal generator of an embodiment transmits the modulated activation signal through the transmitter coil, wherein the transmitting the modulated activation signal generates a uniform magnetic field within a region around the transmitter coil and defines a first detection area of the region and a second detection area of the region. The transmitting and the generating of an embodiment includes emphasizing a first portion of the carrier waves, wherein the uniform magnetic field includes flux lines travelling in a first direction in the first detection area and a second direction in the second detection area, wherein the first direction is different than the second direction. The receiver of an embodiment travels through the region, the receiver using information of the emphasized first portion to detect a first polarity of the uniform magnetic field in the first detection area and a second polarity of the uniform magnetic field in the second detection area, the second polarity comprising a reversal of the first polarity, wherein detecting the reversal comprises the receiver transitioning across the boundary from the first detection area to the second detection area.

Embodiments described herein include detecting motion of one or more objects in a vicinity of the transmitter coil using a motion sensing detection device, wherein the vicinity includes the region, wherein the one or more objects include the receiver.

The transmitting the modulated activation signal of an embodiment at a first rate when the motion is detected and otherwise at a second rate, wherein the first rate is different than the second rate.

Embodiments described herein include placing a transmitter coil at a boundary, generating an activation signal comprising a plurality of data packets, modulating the activation signal onto carrier waves, wherein the carrier waves comprise the plurality of data packets, transmitting the modulated activation signal through the transmitter coil, the transmitting the modulated activation signal generating a uniform magnetic field within a region around the transmitter coil and defining a first detection area of the region and a second detection area of the region, the transmitting and the generating including emphasizing a first portion of the carrier waves. Embodiments described herein include detecting motion of one or more objects in a vicinity of the transmitter coil using a motion sensing detection device, wherein the vicinity includes the region. Embodiments described herein include transmitting the modulated activation signal at a first rate when the motion is detected and otherwise at a second rate, wherein the first rate is different than the second rate. Embodiments described herein include using information detected by a receiver passing through the region including information of the emphasized first portion to determine a first polarity of the uniform magnetic field in the first detection area and a second polarity of the uniform magnetic field in the second detection area, the second polarity comprising a reversal of the first polarity, wherein detecting the reversal comprises a transition through the boundary from the first detection area to the second detection area, wherein the detecting the reversal comprises applying a stimulus to an animal wearing the receiver.

Embodiments described herein include placing a transmitter coil at a boundary, wherein the transmitter coil comprises a wire uniformly wound around a length of a thin strip of material. Embodiments described herein generating an activation signal comprising a plurality of data packets. Embodiments described herein include modulating the activation signal onto carrier waves, wherein the carrier waves comprise a plurality of data packets. Embodiments described herein include transmitting the modulated activation signal through the transmitter coil, the transmitting the modulated activation signal generating a uniform magnetic field within a region around the transmitter coil and defining a first detection area of the region and a second detection area of the region, the transmitting and the generating including emphasizing a first portion of the carrier waves. Embodiments described herein include using information detected by a receiver passing through the region including information of the emphasized first portion to detect a first polarity of the uniform magnetic field in the first detection area and a second polarity of the uniform magnetic field in the second detection area, the second polarity comprising a reversal of the first polarity, wherein detecting the reversal comprises a transition across the boundary from the first detection area to the second detection area, wherein flux lines of the uniform magnetic field travel along pathways in the first detection area corresponding to the first polarity and along pathways in the second detection area corresponding to the second polarity.

A system is described that comprises under an embodiment a transmitter for generating a magnetic field comprising a first detection region and a second detection region, wherein the first detection region is different than the second detection region. The system includes a receiver configured to detect at a location of the receiver in the magnetic field a magnetic field vector, a polarity, and at least one additional vector. The system includes the receiver configured to use the magnetic field vector, the polarity, and the at least one additional vector to determine a position of the receiver in the magnetic field.

The transmitter of an embodiment is positionable at a boundary, wherein the first detection region comprises a first side of the boundary, wherein the second detection region comprises a second side of the boundary.

The generating the magnetic field includes a signal generator modulating a signal onto carrier waves, under an embodiment.

The generating the magnetic field includes under an embodiment the signal generator transmitting the modulated signal through a transmitter coil, the transmitting comprising emphasizing a first portion of the carrier waves.

The receiver of an embodiment is configured to use information of the emphasized first portion to detect a first polarity of the magnetic field in the first detection area and a second polarity of the magnetic field in the second detection area, wherein the first polarity is different than the second polarity.

The at least one additional vector of an embodiment comprises a gravity vector.

The detecting the magnetic field vector includes under an embodiment detecting the magnetic field vector using a magnetometer.

The detecting the gravity vector includes under an embodiment detecting the gravity vector using at least one of a 3-axis accelerometer, a gyroscope, and a magnetometer.

The determining the position comprises under an embodiment determining an angle between the magnetic field vector and the gravity vector.

The determining the position comprises under an embodiment determining a presence of the receiver in the first detection area when the angle is less than a first threshold value and the polarity comprises the first polarity.

The determining the position comprises under an embodiment determining a presence of the receiver in the second detection area when the angle is less than a second threshold value and the polarity comprises the second polarity.

The determining the angle comprises under an embodiment computing an inverse cosine of a dot product of the magnetic field vector and the gravity vector divided by the product of their magnitudes.

The determining the angle comprises under an embodiment describing a sphere, wherein the sphere includes a first radius and a center point.

The magnetic field vector and the gravity vector of an embodiment originate at the center point.

The magnetic field vector of an embodiment intersects the sphere at coordinates $x_1$, $y_1$, $z_1$.

The gravity vector of an embodiment intersects the sphere at coordinates $x_2$, $y_2$, $z_2$.

The determining the angle comprises computing a distance between coordinates $x_1$, $y_1$, $z_1$ and $x_2$, $y_2$, $z_2$ as $Sqrt((x_2-x_1)^2+(y_2-y_1)^2+(z_2-z_1)^2)$, under an embodiment.

The determining the angle comprises under an embodiment computing the angle using information of the first radius and the distance.

The magnetic field of an embodiment comprises a plurality of signal field amplitudes.

The generating the magnetic field comprises under an embodiment periodically adjusting an amplitude of the magnetic field between the plurality of signal field amplitudes.

A system is descried comprising under an embodiment a transmitter for generating a magnetic field that defines a boundary. The system includes a receiver configured to detect at a location of the receiver in the magnetic field a magnetic field vector, a polarity, and at least one additional vector. The system includes the receiver configured to use the magnetic field vector, the polarity, and at least one additional vector to determine a position of the receiver in the magnetic field relative to the boundary.

A system is described under an embodiment that comprises a transmitter for generating a magnetic field comprising a first detection region and a second detection region, wherein the first detection region is different than the second detection region The system includes a receiver configured to detect at a location of the receiver in the magnetic field a magnetic field vector, a polarity, and at least one additional vector. The system includes the receiver configured to compute an angle between the magnetic field vector and the at least one additional vector. The system includes the receiver configured to determine a presence of the receiver in the first detection area when the angle falls below a first value and the polarity comprises a first polarity.

The receiver of an embodiment is configured to determine a presence of the receiver in the second detection area when the angle falls below a second value and the polarity comprises a second polarity, wherein the first polarity is different than the second polarity.

The at least one additional vector comprises a gravity vector, under an embodiment.

The threshold barrier system can be a component of a single system, multiple systems, and/or geographically separate systems. The threshold barrier system can also be a subcomponent or subsystem of a single system, multiple systems, and/or geographically separate systems. The threshold barrier system components can be coupled to one or more other components (not shown) of a host system or a system coupled to the host system.

One or more components of the threshold barrier system and/or a corresponding interface, system or application to which the threshold barrier system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the threshold barrier system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

Aspects of the threshold barrier system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the threshold barrier system and corresponding systems and methods include: microcontrollers with memory (such as electronically erasable programmable read only memory (EEPROM)), embedded microprocessors, firmware, software, etc. Furthermore, aspects of the threshold barrier system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the threshold barrier system and corresponding systems and methods is not intended to be exhaustive or to limit the systems and methods to the precise forms disclosed. While specific embodiments of, and examples for, the threshold barrier system and corresponding systems and methods are described herein for illustrative purposes, various equivalent modifications are possible within the scope of the systems and methods, as those skilled in the relevant art will recognize. The teachings of the threshold barrier system and corresponding systems and methods provided herein can be applied to other systems and methods, not only for the systems and methods described above.

The elements and acts of the various embodiments described above can be combined to provide further embodiments. These and other changes can be made to the threshold barrier system and corresponding systems and methods in light of the above detailed description.

The invention claimed is:

1. A system comprising:
   a transmitter for generating a magnetic field comprising a first detection region and a second detection region, wherein the first detection region is different than the second detection region;

a receiver configured to detect at a location of the receiver in the magnetic field a magnetic field vector, a polarity, and at least one additional vector;

the receiver configured to use the magnetic field vector, the polarity, and the at least one additional vector to determine a position of the receiver in the magnetic field, the determining the position including determining an angle between the magnetic field vector and the at least one additional vector, the determining the position including comparing the angle to at least one reference value to determine a difference value, the determining the position including determining a presence of the receiver relative to the transmitter using the angle and the difference value.

2. The system of claim 1, wherein the transmitter is positionable at a boundary, wherein the first detection region comprises a first side of the boundary, wherein the second detection region comprises a second side of the boundary.

3. The system of claim 1, the receiver configured to detect a first polarity of the magnetic field in the first detection area and a second polarity of the magnetic field in the second detection area, wherein the first polarity is different than the second polarity.

4. The system of claim 3, wherein the at least one additional vector comprises a gravity vector.

5. The system of claim 4, the detecting the at least one additional vector including detecting the gravity vector using at least one of a 3-axis accelerometer, a gyroscope, and a magnetometer.

6. The system of claim 4, the determining the presence comprising determining the presence of the receiver in the first detection area when the difference value is less than a first threshold value and the polarity comprises the first polarity.

7. The system of claim 4, the determining the presence comprising determining the presence of the receiver in the second detection area when the angle is less than a second threshold value and the polarity comprises the second polarity.

8. The system of claim 4, the determining the angle comprising computing an inverse cosine of a dot product of the magnetic field vector and the gravity vector divided by the product of their magnitudes.

9. The system of claim 4, the determining the angle comprising describing a sphere, wherein the sphere includes a first radius and a center point.

10. The system of claim 9, wherein the magnetic field vector and the gravity vector originate at the center point.

11. The system of claim 10, wherein the magnetic field vector intersects the sphere at coordinates $x_1, y_1, z_1$.

12. The system of claim 11, wherein the gravity vector intersects the sphere at coordinates $x_2, y_2, z_2$.

13. The system of claim 12, the determining the angle comprising computing a distance between coordinates $x_1, y_1, z_1$ and $x_2, y_2, z_2$ as $\mathrm{Sqrt}((x_2-x_1)^2+(y_2-y_1)^2+(z_2-z_1)^2)$.

14. The system of claim 13, the determining the angle comprising computing the angle using information of the first radius and the distance.

15. The system of claim 1, wherein the magnetic field comprises a plurality of signal field amplitudes.

16. The system of claim 15, the generating the magnetic field comprising periodically adjusting an amplitude of the magnetic field between the plurality of signal field amplitudes.

17. The system of claim 1, the detecting the magnetic field vector including detecting the magnetic field vector using a magnetometer.

18. A system comprising:

a transmitter for generating a magnetic field that defines a boundary;

a receiver configured to detect at a location of the receiver in the magnetic field a magnetic field vector, a polarity, and at least one additional vector;

the receiver configured to use the magnetic field vector, the polarity, and at least one additional vector to determine a position of the receiver in the magnetic field relative to the boundary, the determining the position including determining an angle between the magnetic field vector and the at least one additional vector, the determining the position including comparing the angle to at least one reference value to determine a difference value, the determining the position including determining a presence of the receiver relative to the transmitter using the angle and the difference value.

19. A system comprising:

a transmitter for generating a magnetic field comprising a first detection region and a second detection region, wherein the first detection region is different than the second detection region;

a receiver configured to detect at a location of the receiver in the magnetic field a magnetic field vector, a polarity, and at least one additional vector;

the receiver configured to compute an angle between the magnetic field vector and the at least one additional vector;

the receiver configured to determine a first presence of the receiver in the first detection area when the angle falls below a first value and the polarity comprises a first polarity;

the receiver configured to determine a second presence of the receiver in the second detection area when the angle falls below a second value and the polarity comprises a second polarity, wherein the first polarity is different than the second polarity.

20. The system of claim 19, wherein the at least one additional vector comprises a gravity vector.

* * * * *